S010149198B2

United States Patent
Vermani et al.

(10) Patent No.: US 10,149,198 B2
(45) Date of Patent: Dec. 4, 2018

(54) TECHNIQUES FOR TRANSMITTING AND/OR RECEIVING HIGH EFFICIENCY WIRELESS LOCAL AREA NETWORK INFORMATION

(71) Applicant: QUALCOMM Incorporated, San Diego, CA (US)

(72) Inventors: Sameer Vermani, San Diego, CA (US); Rahul Tandra, San Diego, CA (US); Arjun Bharadwaj, Poway, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 133 days.

(21) Appl. No.: 15/138,972

(22) Filed: Apr. 26, 2016

(65) Prior Publication Data

US 2016/0323778 A1 Nov. 3, 2016

Related U.S. Application Data

(60) Provisional application No. 62/153,861, filed on Apr. 28, 2015.

(51) Int. Cl.
*H04W 4/00* (2018.01)
*H04W 28/06* (2009.01)
(Continued)

(52) U.S. Cl.
CPC ......... *H04W 28/065* (2013.01); *H04L 5/0044* (2013.01); *H04L 5/0053* (2013.01); *H04W 72/04* (2013.01); *H04W 84/12* (2013.01)

(58) Field of Classification Search
CPC ... H04W 28/065; H04W 72/04; H04W 84/12; H04L 5/0007; H04L 5/0044; H04L 5/0053; H04L 5/0094
See application file for complete search history.

(56) References Cited

U.S. PATENT DOCUMENTS

2014/0307612 A1  10/2014  Vermani et al.
2014/0369276 A1*  12/2014  Porat ............... H04L 5/003
                                                 370/329
(Continued)

OTHER PUBLICATIONS

ISA/EPO, International Search Report and Written Opinion of the International Searching Authority, Int'l. App. No. PCT/US2016/029503, dated Jul. 27, 2016, European Patent Office, Rijswijk, NL, 11 pgs.

*Primary Examiner* — Abdelnabi O Musa
(74) *Attorney, Agent, or Firm* — Holland & Hart LLP/Qualcomm

(57) ABSTRACT

Techniques are described for wireless communication. A method for wireless communication at an access point may include identifying a number of stations to receive data from the access point, and generating a downlink frame to transmit the data to the identified number of stations. The downlink frame may include a first signaling field (e.g., a wireless local area network (WLAN) signaling field) directed to the identified number of stations. The first signaling field may include a first segment and a second segment. The first segment may include information common to each of the identified number of stations. The second segment may include at least one information block. Each information block may be separately encoded for each of the identified number of stations. The method may also include transmitting the downlink frame to the identified number of stations.

70 Claims, 12 Drawing Sheets

(51) Int. Cl.
*H04W 72/04* (2009.01)
*H04L 5/00* (2006.01)
*H04W 84/12* (2009.01)

(56) References Cited

U.S. PATENT DOCUMENTS

| | | | |
|---|---|---|---|
| 2015/0139089 A1* | 5/2015 | Azizi | H04W 4/008 370/329 |
| 2015/0146808 A1* | 5/2015 | Chu | H04L 5/0037 375/260 |
| 2016/0255610 A1* | 9/2016 | Li | H04B 7/0413 370/329 |
| 2016/0262157 A1* | 9/2016 | Kim | H04B 7/0413 |
| 2016/0309478 A1* | 10/2016 | Nabetani | H04B 7/0697 |

* cited by examiner

TECHNIQUES FOR TRANSMITTING AND/OR RECEIVING HIGH EFFICIENCY WIRELESS LOCAL AREA NETWORK INFORMATION

CROSS REFERENCES

The present application for patent claims priority to U.S. Provisional Patent Application No. 62/153,861 by Vermani et al., titled "Techniques for Transmitting and/or Receiving High Efficiency Wireless Local Area Network Information," filed Apr. 28, 2015, assigned to the assignee hereof, and expressly incorporated by reference herein.

BACKGROUND

Field of the Disclosure

The present disclosure, for example, relates to wireless communication systems, and more particularly to techniques for transmitting and/or receiving high efficiency wireless local area network (WLAN) information.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network (e.g., a WLAN, such as a Wi-Fi network conforming to at least one of the IEEE 802.11 family of standards) may include an access point (AP) that may communicate with at least one station (STAs) or mobile device. The AP may be coupled to a network, such as the Internet, and may enable a station or mobile device to communicate via the network (and/or communicate with other devices coupled to the AP).

A protocol or standard used in a wireless network may define a frame structure (e.g., packet structure), including the information that may be transmitted using the frame structure. In some cases, separate but similar frame structures may be defined for downlink frames (used for transmitting data and/or control signals from an AP to a station) and uplink frames (used for transmitting data and/or control signals from a station to an AP).

SUMMARY

The described techniques generally relate to transmitting and/or receiving high efficiency WLAN information. A new variant of the IEEE 802.11 family of standards is the IEEE 802.11ax standard. The IEEE 802.11ax standard provides for a frame including a number of high efficiency WLAN signaling fields. The described techniques describe high efficiency WLAN signaling fields that may be generated and/or transmitted to provide good performance, efficiency, and/or flexibility for IEEE 802.11ax communications. The described techniques may also be applied to generating and/or transmitting high efficiency signaling fields included in other types of frames.

In a first set of illustrative examples, a method for wireless communication at an access point is described. In one configuration, the method may include identifying a number of stations to receive data from the access point, and generating a downlink frame to transmit the data to the identified number of stations. The downlink frame may include a first signaling field directed to the identified number of stations. The first signaling field may include a first segment and a second segment. The first segment may include information common to each of the identified number of stations. The second segment may include at least one information block. The first signaling field may be a local wireless area network (WLAN) signaling field. Each information block may be separately encoded for each of the identified number of stations. The method may also include transmitting the downlink frame to the identified number of stations.

In some examples, the method may include duplicating the information common to each of the identified number of stations, and transmitting the duplicated information in each of a plurality of sub-bands of a shared radio frequency spectrum band. In some examples, for a transmission (e.g., an 80 MHz transmission), the information common to each of the identified number of stations may be duplicated at least one time. In some examples, the method may include transmitting each of the separately encoded information blocks in one sub-band of a shared radio frequency spectrum band; for example, for a 40 MHz transmission. In other examples, such as an 80 MHz transmission, the separately encoded information blocks may be transmitted in two sub-bands of a shared radio frequency spectrum band. In other example frequency spectrum bands, the separately encoded information blocks may be transmitted in four sub-bands, with each sub-band equal to 20 MHz. In some examples of the method, the downlink frame may include a data field, and the method may include transmitting data for each of the identified number of stations in the data field, where the separately encoded information blocks and the data are transmitted in a same sub-band of a shared radio frequency spectrum band. In some examples of the method, the downlink frame may further include a second signaling field that is separately encoded from the first signaling field, and the method may include using a same delay spread protection mechanism in each of the first segment of the first signaling field and the second signaling field. In some examples, the first and/or the second signaling fields may be WLAN signaling fields. In some examples, the same delay spread protection mechanism may include a time domain repetition, or a frequency domain repetition, or a combination thereof. In some examples, the method may include indicating, in legacy signaling information of the downlink frame, a use of a delay spread protection mechanism in the first segment of the first signaling field.

In some examples, the method may include transmitting each of the separately encoded information blocks within one orthogonal frequency division multiplexing (OFDM) symbol of the first signaling field. In some of these examples, the method may include transmitting each of the separately encoded information blocks in one sub-band of a shared radio frequency spectrum band. In some examples, each sub-band in which a separately encoded information block is transmitted may have a bandwidth of 20 Megahertz (MHz). In some examples, the method may include transmitting at least two separately encoded information blocks in at least one OFDM symbol. In some examples, the first WLAN signaling field may include a first OFDM symbol associated with a first modulation and coding scheme (MCS) and a second OFDM symbol associated with a second MCS that is different from the first MCS. In these examples, the method may include mapping a first separately encoded information block for a first station to the first OFDM symbol, and mapping a second separately encoded information block for a second station to the second OFDM symbol. In some of these examples, the method may include transmitting each of the separately encoded information blocks in one sub-band of a shared radio frequency spectrum band. In some examples, the first separately encoded information block may be transmitted in a first sub-band, and the method may include mapping a third separately encoded information block for a third station to the first OFDM symbol and the first sub-band.

In some examples, the method may include using a delay spread protection mechanism to protect each separately encoded information block in the second segment of the first signaling field. In some examples, the delay spread protection mechanism may include a frequency domain repetition, or a lengthened guard interval (GI), or a combination thereof. In some examples, the method may include signaling, in a second signaling field, bandwidth information used by a station to identify a separately encoded information block in the first signaling field that is intended for the station. In some examples, the method may include transmitting, in a second signaling field, information usable by a station other than the identified number of stations. In some examples, the method may include transmitting, in the first segment of the first signaling field, information usable by the identified number of stations to decode the separately encoded information blocks. In some examples, the method may include using tail-biting convolutional coding in the first segment of the first signaling field, or the second segment of the first signaling field, or a second signaling field, or a combination thereof.

In a second set of illustrative examples, an apparatus for wireless communication at an access point is described. In one configuration, the apparatus may include means for identifying a number of stations to receive data from the access point, and means for generating a downlink frame to transmit the data to the identified number of stations. The downlink frame may include a first signaling field directed to the identified number of stations. The first signaling field may include a first segment and a second segment. In some examples, the first signaling field may be a WLAN signaling field. The first segment may include information common to each of the identified number of stations. The second segment may include at least one information block. Each information block may be separately encoded for each of the identified number of stations. The apparatus may also include means for transmitting the downlink frame to the identified number of stations. In some examples, the apparatus may further include means for implementing aspects of the method described above with respect to the first set of illustrative examples.

In a third set of illustrative examples, another apparatus for wireless communication at an access point is described. In one configuration, the apparatus may include a transmission manager to identify a number of stations to receive data from the access point, and a downlink frame generator to generate a downlink frame to transmit the data to the identified number of stations. The downlink frame may include a first signaling field directed to the identified number of stations. The first signaling field may include a first segment and a second segment. In some examples, the first signaling field may be a WLAN signaling field. The first segment may include information common to each of the identified number of stations. The second segment may include at least one information block. Each information block may be separately encoded for each of the identified number of stations. The apparatus may also include a downlink frame transmitter to transmit the downlink frame to the identified number of stations. In some examples, the apparatus may further include components for implementing aspects of the method described above with respect to the first set of illustrative examples.

In a fourth set of illustrative examples, a non-transitory computer-readable medium storing computer-executable code for wireless communication at an access point is described. In one configuration, the code may be executable by a processor to identify a number of stations to receive data from the access point, and to generate a downlink frame to transmit the data to the identified number of stations. The downlink frame may include a first signaling field directed to the identified number of stations. The first signaling field may include a first segment and a second segment. In some examples, the first signaling field may be a WLAN signaling field. The first segment may include information common to each of the identified number of stations. The second segment may include at least one information block. Each information block may be separately encoded for each of the identified number of stations. The code may also be executable by the processor to transmit the downlink frame to the identified number of stations. In some examples, the computer-readable medium may also include code to implement aspects of the method described above with respect to the first set of illustrative examples.

In a fifth set of illustrative examples, a method for wireless communication at a station is described. In one configuration, the method may include receiving a downlink frame in a shared radio frequency spectrum band. The downlink frame may include at least a first signaling field and a second signaling field. The first signaling field and the second signaling field may be separately encoded. The second signaling field may include a first segment having information common to a number of stations and a second segment having separately encoded information blocks for each of the number of stations. In some examples, the first and/or the second signaling fields may be WLAN signaling fields. The method may also include decoding a separately encoded information block for the station using information received in the first segment of the second signaling field. In some examples, the method may further include decoding the separately encoded information block using information received in the first signaling field.

In a sixth set of illustrative examples, an apparatus for wireless communication at a station is described. In one configuration, the apparatus may include means for receiving a downlink frame in a shared radio frequency spectrum band. The downlink frame may include at least a first signaling field and a second signaling field. In some examples, the first and/or the second signaling fields may be WLAN signaling fields. The first signaling field and the second signaling field may be separately encoded. The second signaling field may include a first segment having information common to a number of stations and a second segment having separately encoded information blocks for each of the number of stations. The apparatus may also include means for decoding a separately encoded information block for the station using information received in the first segment of the second signaling field. In some examples, the apparatus may further include means for decoding the separately encoded information block using information received in the first signaling field.

In a seventh set of illustrative examples, another apparatus for wireless communication at a station is described. In one configuration, the apparatus may include a downlink frame decoder to receive a downlink frame in a shared radio frequency spectrum band. The downlink frame may include at least a first signaling field and a second signaling field. In some examples, the first and/or the second signaling fields may be WLAN signaling fields. The first signaling field and the second signaling field may be separately encoded. The second signaling field may include a first segment having information common to a number of stations and a second segment having separately encoded information blocks for each of the number of stations. The downlink frame decoder may decode a separately encoded information block for the station using information received in the first segment of the second signaling field. In some examples, the downlink frame decoder may further decode the separately encoded information block using information received in the first signaling field.

In an eighth set of illustrative examples, a non-transitory computer-readable medium storing computer-executable code for wireless communication at a station is described. In one configuration, the code may be executable by a processor to receive a downlink frame in a shared radio frequency spectrum band. The downlink frame may include at least a first signaling field and a second signaling field. In some examples, the first and/or the second signaling fields may be WLAN signaling fields. The first signaling field and the second signaling field may be separately encoded. The second signaling field may include a first segment having information common to a number of stations and a second segment having separately encoded information blocks for each of the number of stations. The code may also be executable by the processor to decode a separately encoded information block for the station using information received in the first segment of the second signaling field. In some examples, the code may also be executable by the processor to decode the separately encoded information block using information received in the first signaling field.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

A preamble of a WLAN frame (or packet) may include information having a variety of purposes. For example, the preamble of a WLAN frame may include information directed to at least one intended receiver (e.g., at least one AP or station). The preamble may also include information directed to non-intended receivers (e.g., information that may inform APs, stations, or other devices not participating in a communication that the radio frequency spectrum band (or channel) used for the communication is busy). Some or all of the information directed to the non-intended receivers may be information conforming to legacy versions of a standard or protocol used to generate and/or transmit the frame.

The techniques described in the present disclosure indicate, for example, how to generate and/or transmit high efficiency WLAN signaling fields that may be included in a downlink or uplink frame. In some examples, the downlink or uplink frame may be used for IEEE 802.11ax communications. In some examples, the downlink or uplink frame may be used for other types of communications.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
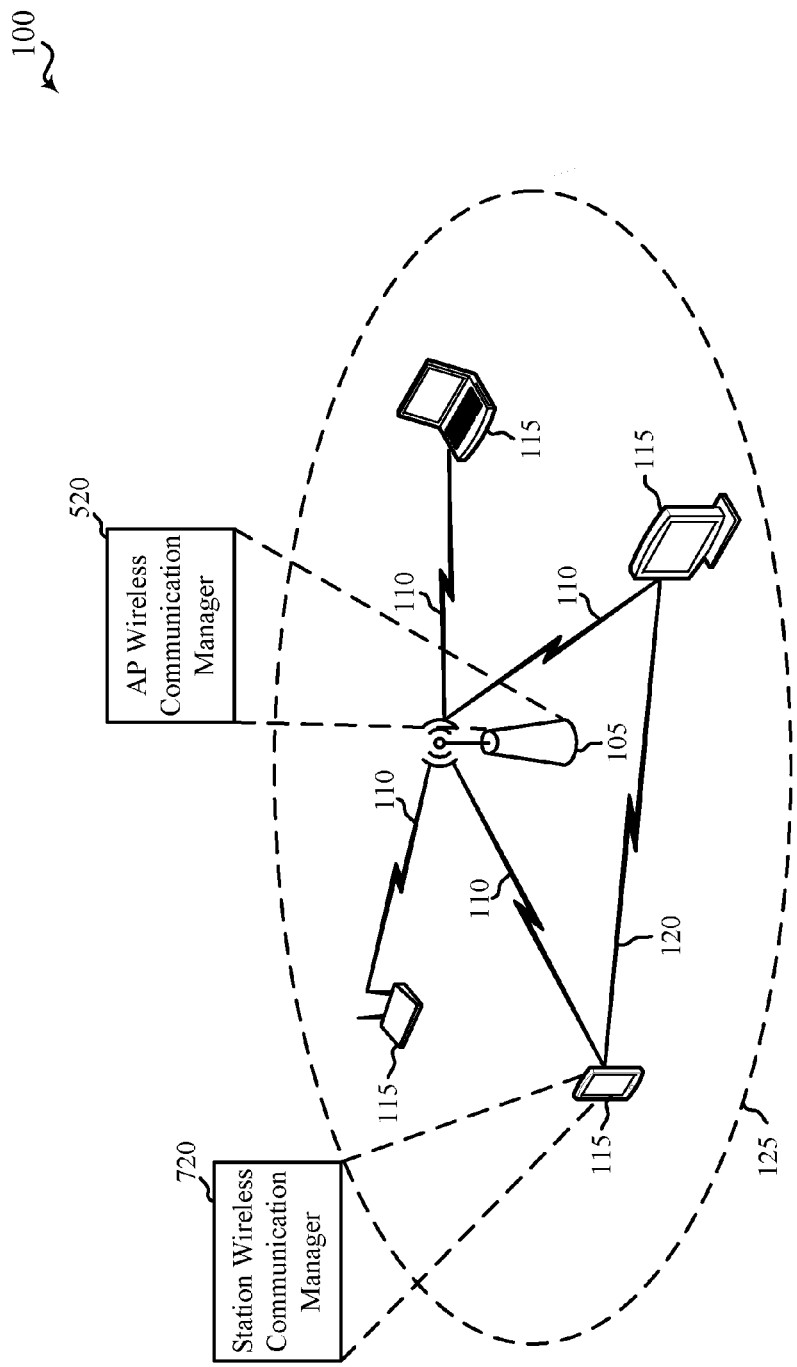
FIG. 1 shows a block diagram of a wireless communication system, in accordance with various aspects of the present disclosure.

Referring first to FIG. 1, a block diagram illustrates an example of a WLAN network 100 (e.g., a network implementing at least one of the IEEE 802.11 family of standards), in accordance with various aspects of the present disclosure. The WLAN network 100 may include an access point (AP) 105 and at least one wireless device or station (STA) 115, such as mobile stations, personal digital assistants (PDAs), other handheld devices, netbooks, notebook computers, tablet computers, laptops, display devices (e.g., TVs, computer monitors, etc.), printers, etc. While only one AP 105 is illustrated, the WLAN network 100 may include multiple APs 105. Each of the stations 115, which may also be referred to as mobile stations (MSs), mobile devices, access terminals (ATs), user equipments (UEs), subscriber stations (SSs), or subscriber units, may associate and communicate with the AP 105 via a communication link 110. Each AP 105 may have a geographic coverage area 125, such that stations 115 within the geographic coverage area 125 can typically communicate with the AP 105. The stations 115 may be dispersed throughout the geographic coverage area 125. Each station 115 may be stationary or mobile.

Although not shown in FIG. 1, a station 115 can be covered by more than one AP 105 and can therefore associate with APs 105 at different times. A single AP 105 and an associated set of stations may be referred to as a basic service set (BSS). An extended service set (ESS) may include a set of connected BSSs. A distribution system (DS) (not shown) may be used to connect APs 105 in an extended service set. A geographic coverage area 125 for an AP 105 may be divided into sectors making up only a portion of the coverage area (not shown). The WLAN network 100 may include APs 105 of different types (e.g., metropolitan area, home network, etc.), with varying sizes of coverage areas and overlapping coverage areas for different technologies. Although not shown, other wireless devices can communicate with the AP 105.

While the stations 115 may communicate with each other through the AP 105 using communication links 110, a station 115 may also communicate directly with another station 115 via a direct wireless link 120. Two or more stations 115 may communicate via a direct wireless link 120 when both stations 115 are in the geographic coverage area 125 of an AP 105, or when one or neither station 115 is within the geographic coverage area 125 of the AP 105 (not shown). Examples of direct wireless links 120 may include Wi-Fi Direct connections, connections established using a Wi-Fi Tunneled Direct Link Setup (TDLS) link, and other peer-to-peer (P2P) group connections. The stations 115 in these examples may communicate according to a WLAN radio and baseband protocol, including physical and MAC layers, described by the IEEE 802.11 family of standards, including, but not limited to, 802.11b, 802.11g, 802.11a, 802.11n, 802.11ac, 802.11ad, 802.11ah, 802.11ax, etc. In other implementations, other P2P connections and/or ad hoc networks may be implemented within the WLAN network 100.

In the WLAN network 100, an AP 105 may transmit messages to or receive messages from at least one station 115 according to various versions of the IEEE 802.11 standard, including new wireless standards. In some examples, the AP 105 may include an AP wireless communication manager 520. The AP wireless communication manager 520 may be used to generate and/or transmit downlink frames and/or to receive uplink frames. Likewise, a station 115 may include a station wireless communication manager 720. The station wireless communication manager 720 may be used to receive downlink frames and/or to generate and/or transmit uplink frames.

Figure 2:
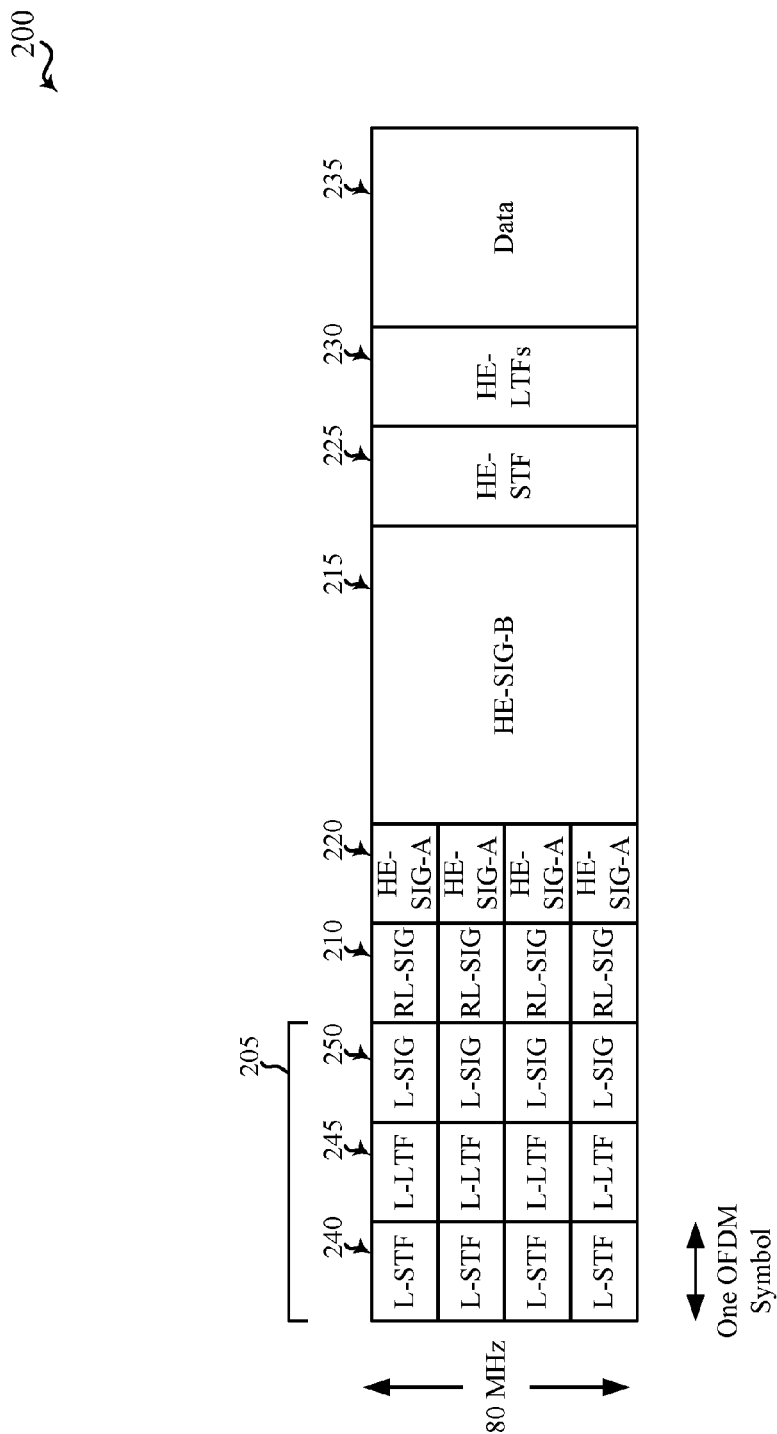
FIG. 2 shows an example of a downlink frame usable for downlink communications between an access point and each of a number of stations identified by the access point, in accordance with various aspects of the present disclosure.

FIG. 2 shows an example of a downlink frame 200 usable for downlink communications between an AP and each of a number of stations identified by the AP, in accordance with various aspects of the present disclosure. In some examples, the AP may be an example of aspects of the AP 105 described with reference to FIG. 1, and the number of stations may be examples of aspects of the stations 115 described with reference to FIG. 1.

The downlink frame 200 may include a legacy WLAN preamble field 205, a repeated legacy WLAN signaling field 210 (RL-SIG), a first WLAN signaling field 215 (e.g., a first high efficiency WLAN signaling field, labeled HE-SIG-B), a second WLAN signaling field 220 (e.g., a second high efficiency WLAN signaling field, labeled HE-SIG-A), a WLAN short training field (STF) 225 (e.g., a high efficiency WLAN STF, labeled HE-STF), at least one WLAN long training field (LTF) 230 (e.g., at least one high efficiency WLAN LTF, labeled RE-LTFs), and/or a data field 235. In some examples, the fields may be transmitted in the following order: legacy WLAN preamble field 205, repeated legacy WLAN signaling field 210, second WLAN signaling field 220, first WLAN signaling field 215, HE-STF 225, HE-LTFs 230, data field 235.

The downlink frame 200 may be transmitted over a radio frequency spectrum band, which in some examples may include a plurality of sub-bands. In some examples, the radio frequency spectrum band may have a bandwidth of 80 MHz, and each of the sub-bands may have a bandwidth of 20 MHz.

The legacy WLAN preamble field 205 may include legacy STF (L-STF) information 240, legacy LTF (L-LTF) information 245, and/or legacy signaling (L-SIG) information 250. When the radio frequency spectrum band includes a plurality of sub-bands, the L-STF, L-LTF, and L-SIG information may be duplicated and transmitted in each of the plurality of sub-bands. The L-SIG information 250 may be further duplicated and transmitted in each sub-band of the repeated legacy WLAN signaling field 210 as repeated legacy signaling (RL-SIG) information. The repeated legacy WLAN signaling field 210 may indicate to a station that the downlink frame 200 is an IEEE 802.11ax downlink frame.

The second WLAN signaling field 220 may include high efficiency WLAN signaling information usable by stations other than the number of stations that are identified to receive downlink communications in the downlink frame 200. The second WLAN signaling field 220 may also include information usable by the identified number of stations to decode the first WLAN signaling field 215. When the radio frequency spectrum band includes a plurality of sub-bands, the information (e.g., HE-SIG-A information) included in the second WLAN signaling field 220 may be duplicated and transmitted in each sub-band of the second WLAN signaling field 220.

The first WLAN signaling field 215 may include high efficiency WLAN signaling information usable by the number of stations identified to receive downlink communications in the downlink frame 200. More specifically, the first WLAN signaling field 215 may include information usable by the number of stations to decode data received in the data field 235. The first WLAN signaling field 215 may be encoded separately from the second WLAN signaling field 220.

Figure 3:
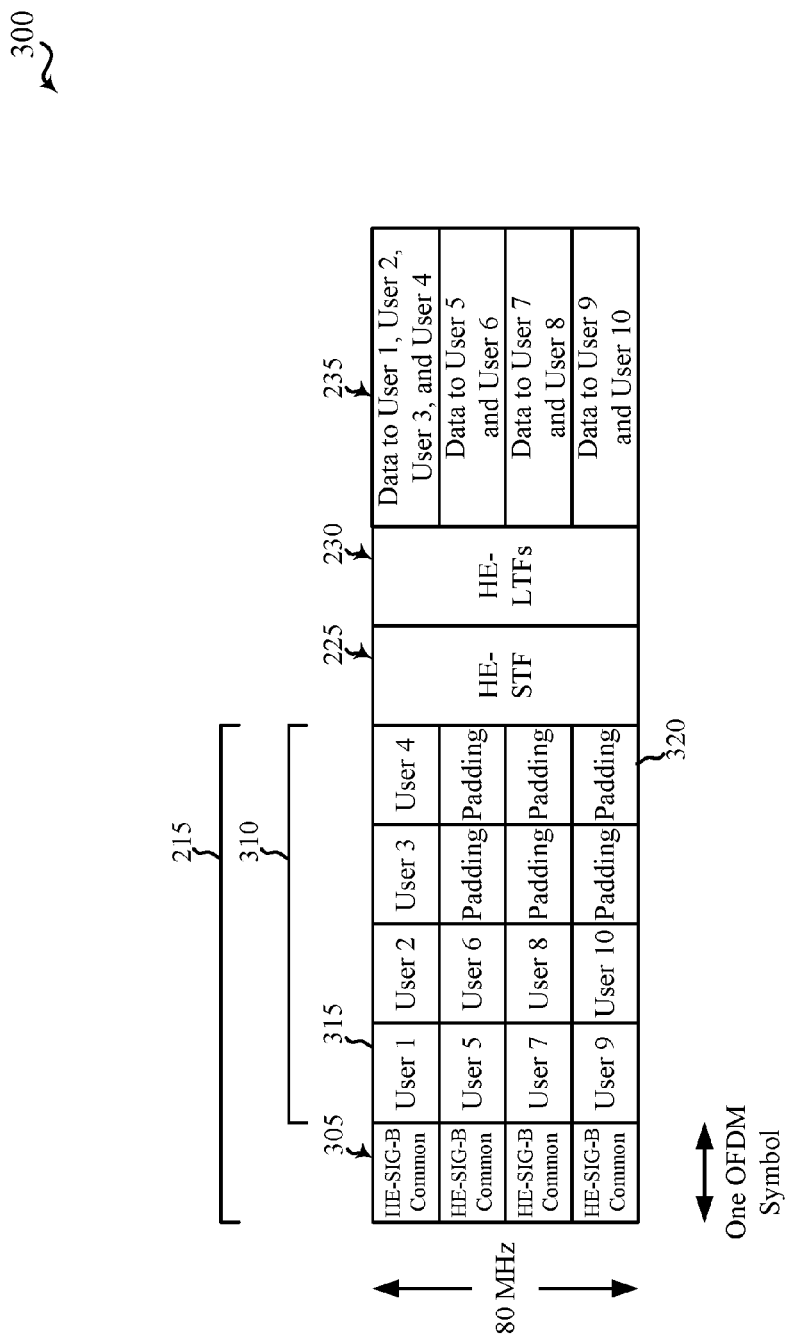
FIG. 3 shows an exemplary configuration of the first WLAN signaling field and data field of the downlink frame described with reference to FIG. 2, in accordance with various aspects of the present disclosure.

FIG. 3 shows an exemplary configuration 300 of the first WLAN signaling field 215 and data field 235 of the downlink frame 200 described with reference to FIG. 2. FIG. 3 also shows the HE-STF 225 and HE-LTFs 230 described with reference to FIG. 2, in accordance with various aspects of the present disclosure.

In some examples, the first WLAN signaling field 215 may be divided into a first segment 305 and a second segment 310. The first segment 305 may include information common to each of an identified number of stations. The second segment 310 may include at least one information block (e.g., one information block 315 for each identified station). Each information block 315 may be separately encoded for each of the identified number of stations.

The first segment 305 of the first WLAN signaling field 215 may include information usable by the identified number of stations to decode the separately encoded information blocks 315 included in the second segment 310 of the first WLAN signaling field 215 (e.g., the information included in the first segment 305 may be used by a station to decode its respective separately encoded information block 315 in the second segment 310). When the radio frequency spectrum band in which the first WLAN signaling field 215 is transmitted includes a plurality of sub-bands, the information included in the first segment 305 (e.g., HE-SIG-B common) may be duplicated and transmitted in each of the plurality of sub-bands. In some examples, the first segment 305 of the first WLAN signaling field 215 may be constrained to one OFDM symbol.

In some examples, a same delay spread protection mechanism may be used in each of the first segment 305 of the first WLAN signaling field 215 (described with reference to FIG. 3) and the second WLAN signaling field 220 (described with reference to FIG. 2). The delay spread protection mechanism may include a time domain repetition, a frequency domain repetition (e.g., MCS10), or a combination thereof. In some examples, the use or non-use of a delay spread protection mechanism in the first segment 305 of the first WLAN signaling field 215 may be indicated in legacy signaling information of a downlink frame including the first WLAN signaling field 215 (e.g., in the L-SIG information 250 described with reference to FIG. 2).

Each of the separately encoded information blocks 315 may include information usable by an identified station to receive (e.g., decode) data transmitted in the data field 235. In some examples, each of the separately encoded information blocks 315 may be transmitted within one OFDM symbol of the first WLAN signaling field 215 (e.g., bleeding of an information block 315 across OFDM symbols may be prohibited). Each of the separately encoded information blocks 315 may also be transmitted in one sub-band of the shared radio frequency spectrum band (e.g., a single information block 315 may be transmitted in only one sub-band, though different information blocks 315 may be transmitted in different sub-bands). When each information block 315 is transmitted in one OFDM symbol in one sub-band, the buffering of Viterbi states may be avoided. In some examples (e.g., when a higher MCS is used for an OFDM symbol), at least two separately encoded information blocks may be transmitted in the same OFDM symbol and sub-band. In other examples, the separately encoded information blocks 315 may be allowed to bleed across OFDM symbols or sub-bands.

In FIG. 3, the second segment 310 may include separately encoded information blocks 315 for ten users or stations (e.g., information blocks 315 labeled User 1 through User 10). In some examples, and for each of the identified number of stations, an information block 315 transmitted for a station in the second segment 310 of the first WLAN signaling field 215 and data transmitted for the station in the data field 235 may be transmitted in a same sub-band. In other examples, the information blocks 315 transmitted in the second segment 310 of the first WLAN signaling field 215 may be arranged for transmission over a fewest number of OFDM symbols and/or the data transmitted in the data field 235 may be arranged for transmission over a fewest number of OFDM symbols. However, this may result in an information block 315 for a station being transmitted in a different sub-band than the data for the station. Regardless of how the information blocks 315 are arranged in the second segment 310 of the first WLAN signaling field 215, the number of information blocks 315 may not be evenly distributed over the plurality of sub-bands, thereby creating a need for the transmission of at least one padding block 320.

In some examples, the separately encoded information blocks 315 may be mapped to OFDM symbols associated with different modulation and coding schemes (MCSs). For example, when the second segment 310 of the first WLAN signaling field 215 includes at least a first OFDM symbol and a second OFDM symbol, the first OFDM symbol may be associated with a first MCS and the second OFDM symbol may be associated with a second MCS, with the second MCS being different from the first MCS. When the first MCS is a higher MCS than the second MCS, an information block for a station in communication with the AP over a better quality communication link may be mapped to the first OFDM symbol, and an information block for a station in communication with the AP over a lower quality communication link may be mapped to the second OFDM symbol. This may enable each of the information blocks 315 to be transmitted to a corresponding station using a most efficient MCS. In some cases, the first WLAN signaling field 215 may include additional OFDM symbols, with each of the additional OFDM symbols being associated with the first MCS, the second MCS, or at least one additional MCS. In some examples (e.g., when a higher MCS is used for an OFDM symbol), at least two separately encoded information blocks 315 may be mapped to a single OFDM symbol and sub-band.

In some examples, a delay spread protection mechanism may be used to protect each separately encoded information block in the second segment of the first WLAN signaling field 215. The delay spread protection mechanism may include a frequency domain repetition (e.g., MCS10), or a lengthened GI, or a combination thereof. In some examples, the use or non-use of a delay spread protection mechanism in the first segment 305 of the first WLAN signaling field 215 may be indicated in legacy signaling information of a downlink frame including the first WLAN signaling field 215 (e.g., in the L-SIG information 250 described with reference to FIG. 2).

A downlink frame including the first WLAN signaling field 215 may be configured for transmissions to multiple users (i.e., in a multiple user (MU) mode) or a transmission to a single user (i.e., in a single user (SU) mode). The information included in the first segment 305 of the first WLAN signaling field 215 may differ depending on whether the downlink frame is configured in the MU mode or the SU mode. Also, when configured in the SU mode, transmission of the second segment 310 of the first WLAN signaling field 215 may be omitted.

The structure of the downlink frame described with reference to FIGS. 2 and 3 may be useful in that the first WLAN signaling field 215 may be independent of the number of stations receiving downlink communications in a downlink frame. For example, as the number of stations grows, the number of separately encoded information blocks 315 included in the second segment 310 of the first WLAN signaling field 215 may increase. The structure of the downlink frame may also be useful in that its performance and efficiency may be independent of the number of stations (e.g., a station may only need to decode a few OFDM symbols, such as an OFDM symbol in which the second WLAN signaling field 220 is transmitted, an OFDM symbol in which the first segment 305 of the first WLAN signaling field 215 is transmitted, and/or an OFDM symbol in which a separately encoded information block 315 is transmitted for the station. The structure of the downlink frame may also be useful in that the separate encoding of information blocks 315 transmitted in the second segment 310 of the first WLAN signaling field 215 may mitigate or eliminate the need to use a delay spread protection mechanism in the information blocks 315 (e.g., because an information block 315 may be received over a shorter time period than the entirety of the first WLAN signaling field 215, or over a shorter time than the second segment 310 of the first WLAN signaling field 215). The structure of the downlink frame may also be useful (e.g., more efficient) in that the information blocks 315 included in the second segment 310 of the first WLAN signaling field 215 are not duplicated.

In some examples of the downlink frame described with reference to FIGS. 2 and 3, the second WLAN signaling field 220 may include information usable by stations other than an identified number of stations. The second WLAN signaling field 220 may also or alternatively include information usable by the identified number of stations to decode the first WLAN signaling field 215. In some examples, the second WLAN signaling field 220 may include an identifier a basic service set (BSS) color; bandwidth information used by a station to identify the separately encoded information block in the first WLAN signaling field that is intended for the station; an indicator of whether a per-user GI is used in the first WLAN signaling field 215 (e.g., an indicator of whether GI lengths used in the first WLAN signaling field 215 may vary per-user); an indicator of whether the frame is a downlink frame or an uplink frame; an indicator of whether the downlink frame is a null data packet; a cyclic redundancy check (CRC) for the second WLAN signaling field 220; and/or information pertaining to channel bonding. When the bandwidth information is included in the second WLAN signaling field 220, the first segment 305 of the first WLAN signaling field 215 may serve as a buffer that enables stations to perform bandwidth switching before receiving an information block 315 in the second segment 310 of the first WLAN signaling field 215. In some examples, tail-biting convolutional coding may be used in the second WLAN signaling field 220.

In some examples, the first segment 305 of the first WLAN signaling field 215 described with reference to FIGS. 2 and 3 may include information usable by an identified number of stations to decode the separately encoded information blocks 315 included in the second segment 310 of the first WLAN signaling field 215 (e.g., the information included in the first segment 305 of the first WLAN signaling field 215 may be used by a station to decode its respective separately encoded information block 315 in the second segment 310 of the first WLAN signaling field 215). In some examples, the first segment 305 of the first WLAN signaling field 215 may include at least one of an indicator of a number of symbols in the first WLAN signaling field 215; an indicator of a MCS used for the first WLAN signaling field 215; an indication of whether the first WLAN signaling field 215 is formatted for a single user (e.g., single station) or multiple users (e.g., multiple stations); an indicator of an amount of frequency error (FE); an indicator of GI length; an indicator of a LTF compression factor used in a WLAN LTF of a downlink frame; an indicator of the number of WLAN LTFs (where the total number of WLAN LTFs can be different from the number of data streams); and/or a CRC for the first segment 305 of the first WLAN signaling field 215. In some examples, tail-biting convolutional coding may be used in the first segment 305 of the first WLAN signaling field 215.

In some examples, each of the separately encoded information blocks 315 included in the second segment 310 of the first WLAN signaling field 215, described with reference to FIGS. 2 and 3, may correspond to an identified one of the stations, and may be decodable by the identified one of the stations. In some examples, the decoding of an information block 315 by a station (and not other stations) may be provided for by exclusively ORing (XORing) a CRC of the information block with a partial association identifier (PAID) of the station. In some examples, a separately encoded information block 315 may include at least one of an indicator of whether resources in a subsequent data stream are allocated as orthogonal frequency-division multiple access (OFDMA) or multi-user multiple-input multiple-output (MU-MIMO) resources; an indicator of a type of resource allocation in the data stream; a station identifier (ID); per-user (e.g., per-station) information such as an indicator of a MCS used for the data stream, an indicator of coding information used for the data stream, an indicator of a number of spatial streams (NSS) used in the data stream, an indicator of whether space-time block coding (STBC) is used in the data stream, or an indicator of whether transmission beamforming (TxBF) is used in the data stream; and/or a CRC (e.g., a CRC XOR'd with a PAID of a station). In some examples, tail-biting convolutional coding may be used in the information block 315.

Figure 4:
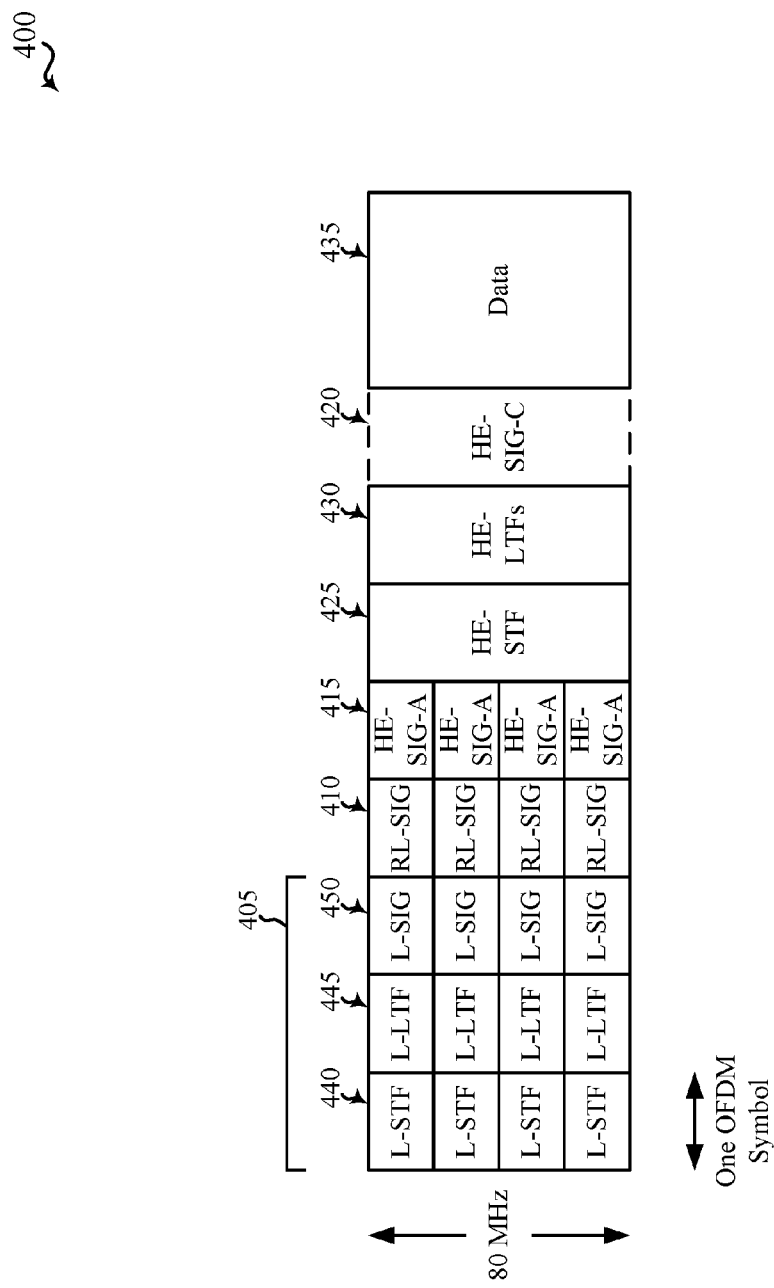
FIG. 4 shows an example of an uplink frame usable for uplink communications between each of a number of stations and an access point, in accordance with various aspects of the present disclosure.

FIG. 4 shows an example of an uplink frame 400 usable for uplink communications between each of a number of stations and an AP, in accordance with various aspects of the present disclosure. In some examples, the AP may be an example of aspects of the AP 105 described with reference to FIG. 1, and the number of stations may be examples of aspects of the stations 115 described with reference to FIG. 1.

The uplink frame 400 may include a legacy WLAN preamble field 405, a repeated legacy WLAN signaling field 410, a WLAN signaling field 415 (e.g., a high efficiency WLAN signaling field, labeled HE-SIG-A), an optional second WLAN signaling field 420 (e.g., a second high efficiency WLAN signaling field, labeled HE-SIG-C), a WLAN short training field (STF) 425 (e.g., a high efficiency WLAN STF, labeled HE-STF), at least one WLAN long training field (LTF) 430 (e.g., at least one high efficiency WLAN LTF, labeled RE-LTFs), and/or a data field 435. In some examples, the fields may be transmitted in the following order: legacy WLAN preamble field 405, repeated legacy WLAN signaling field 410, first WLAN signaling field 415, HE-STF 425, HE-LTFs 430, optional second WLAN signaling field 420, data field 435.

The uplink frame 400 may be transmitted over a radio frequency spectrum band, which in some examples may include a plurality of sub-bands. The radio frequency spectrum band may have a bandwidth of 80 MHz, and each of the sub-bands may have a bandwidth of 20 MHz.

The legacy WLAN preamble field 405 may include L-STF information 440, L-LTF information 445, and/or legacy signaling (L-SIG) information 450. When the radio frequency spectrum band includes a plurality of sub-bands, the L-STF, L-LTF, and L-SIG information may be duplicated and transmitted in each of the plurality of sub-bands. The L-SIG information 450 may be further duplicated and transmitted in each sub-band of the repeated legacy WLAN signaling field 410 as repeated legacy signaling (RL-SIG) information. The repeated legacy WLAN signaling field 410 may indicate to a station or the AP that the uplink frame 400 is an IEEE 802.11ax uplink frame.

The first WLAN signaling field 415 may include high efficiency WLAN signaling information usable by stations for re-use purposes. When the radio frequency spectrum band includes a plurality of sub-bands, the information (e.g., HE-SIG-A information) included in the first WLAN signaling field may be duplicated and transmitted in each sub-band of the first WLAN signaling field.

The second WLAN signaling field 420 may be optional. Prior to the reception of data on an uplink at the AP, the AP may already have certain information as a result of the AP triggering uplink OFDMA and/or uplink MU-MIMO communications. For example, for an uplink OFDMA transmission, the AP may already know the number of space time streams (NSTS), the bandwidth (BW), and/or a maximum duration of an uplink payload. For an uplink MU-MIMO transmission, the AP may already know the tone allocation per station and/or the maximum duration of an uplink payload. However, for an uplink OFDMA transmission, the AP may not know the MCS, STC, or coding, and for an uplink MU-MIMO transmission, the AP may not know the MCS, NSTS, STBC, or coding. The unknown information may be handled in different ways. In some embodiments, a station may be allowed to choose some of the unknown quantities and report the quantities to the AP in the second WLAN signaling field 420. In other embodiments, the AP may be enabled to choose all of the quantities, thereby eliminating a need for the second WLAN signaling field 420. The latter embodiments shift intelligence to the AP, enabling the stations to be relatively dumber and easing interoperations between the AP and stations.

Figure 5:
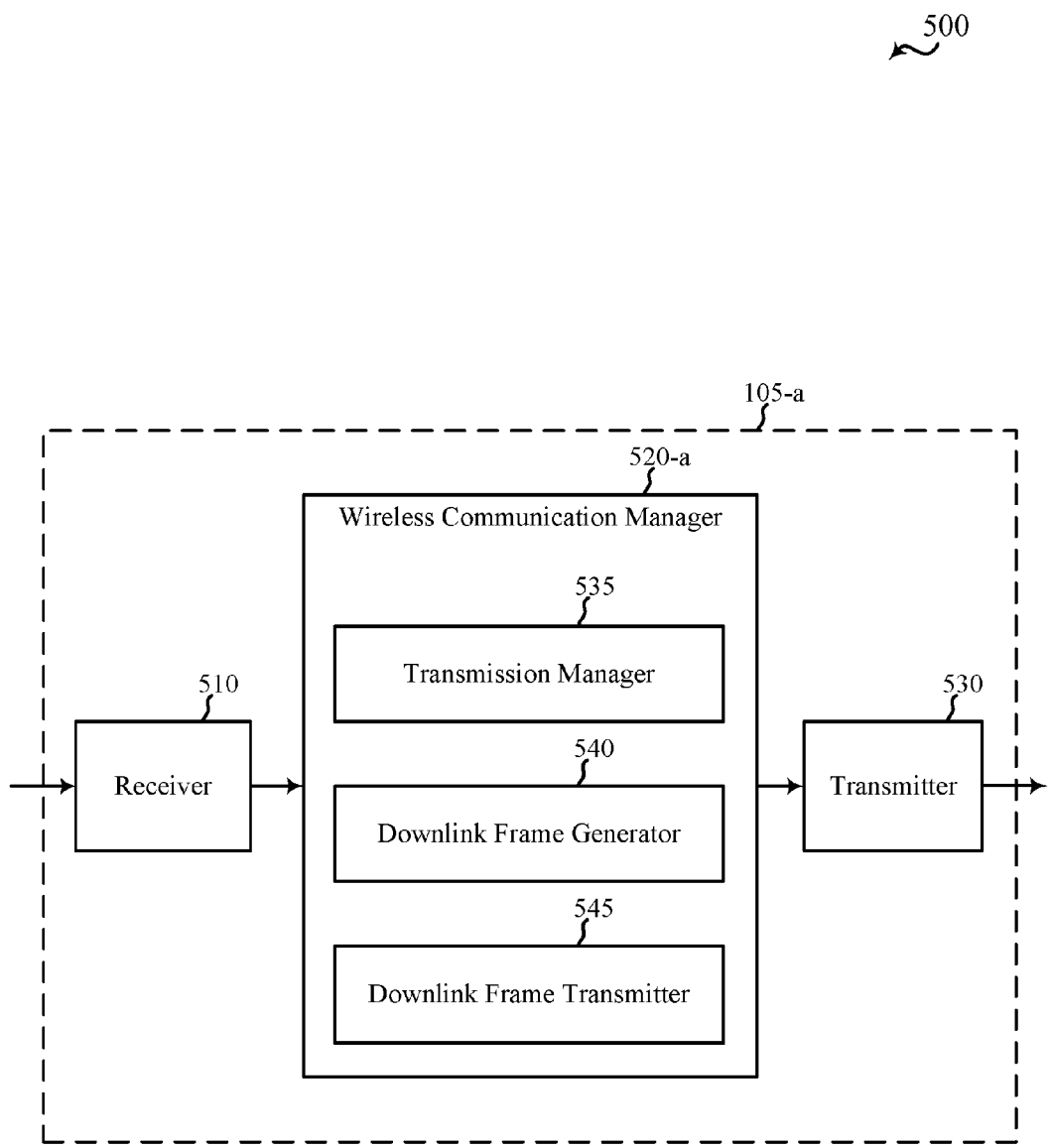
FIG. 5 shows a block diagram of an apparatus for use in wireless communication, in accordance with various aspects of the present disclosure.

FIG. 5 shows a block diagram 500 of an apparatus 105-*a* for use in wireless communication, in accordance with various aspects of the present disclosure. In some examples, the apparatus 105-*a* may be an example of aspects of the APs 105 described with reference to FIG. 1. The apparatus 105-*a* may also be or include a processor (not shown). The apparatus 105-*a* may include a receiver 510, a wireless communication manager 520-*a*, and/or a transmitter 530. Each of these components may be in communication with each other.

The components of the apparatus 105-*a* may, individually or collectively, be implemented using at least one application-specific integrated circuit (ASIC) adapted to perform some or all of the applicable functions in hardware. Alternatively, the functions may be performed by at least one other processing unit (or core), on at least one integrated circuit. In other examples, other types of integrated circuits may be used (e.g., Structured/Platform ASICs, Field Programmable Gate Arrays (FPGAs), a System-on-Chip (SoC), and/or other types of Semi-Custom ICs), which may be programmed in any manner known in the art. The functions of each component may also be implemented, in whole or in part, with instructions embodied in a memory, formatted to be executed by at least one general and/or application-specific processor.

In some examples, the receiver 510 may include at least one radio frequency (RF) receiver. The receiver 510 and/or RF receiver may be used to receive various types of data and/or control signals (i.e., transmissions) over at least one communication link of a wireless communication system, such as at least one communication link of the WLAN network 100 described with reference to FIG. 1.

In some examples, the transmitter 530 may include at least one RF transmitter. The transmitter 530 or RF transmitter may be used to transmit various types of data and/or control signals (i.e., transmissions) over at least one communication link of a wireless communication system, such as at least one communication link of the WLAN network 100 described with reference to FIG. 1.

In some examples, the wireless communication manager 520-*a* may be used to manage at least one aspect of wireless communication for the apparatus 105-*a*. The wireless communication manager 520-*a* may include a transmission manager 535, a downlink frame generator 540, and/or a downlink frame transmitter 545. In some examples, part or all of the downlink frame transmitter 545 may be incorporated into the transmitter 530.

The transmission manager 535 may be used to identify a number of stations to receive data from the apparatus 105-*a*. The downlink frame generator 540 may be used to generate a downlink frame to transmit the data to a number of stations identified by the transmission manager 535. The downlink frame may include a first WLAN signaling field directed to the identified number of stations. The first WLAN signaling field may include a first segment and/or a second segment. The first segment may include information common to each of the identified number of stations. The second segment may include at least one information block. Each information block may be separately encoded for each of the identified number of stations. In some examples, the downlink frame may include aspects of the downlink frame described with reference to FIG. 2 and/or FIG. 3. The downlink frame transmitter 545 may be used to transmit a downlink frame generated by the downlink frame generator 540 to a number of stations identified by the transmission manager 535. The downlink frame may be transmitted via the transmitter 530.

Figure 6:
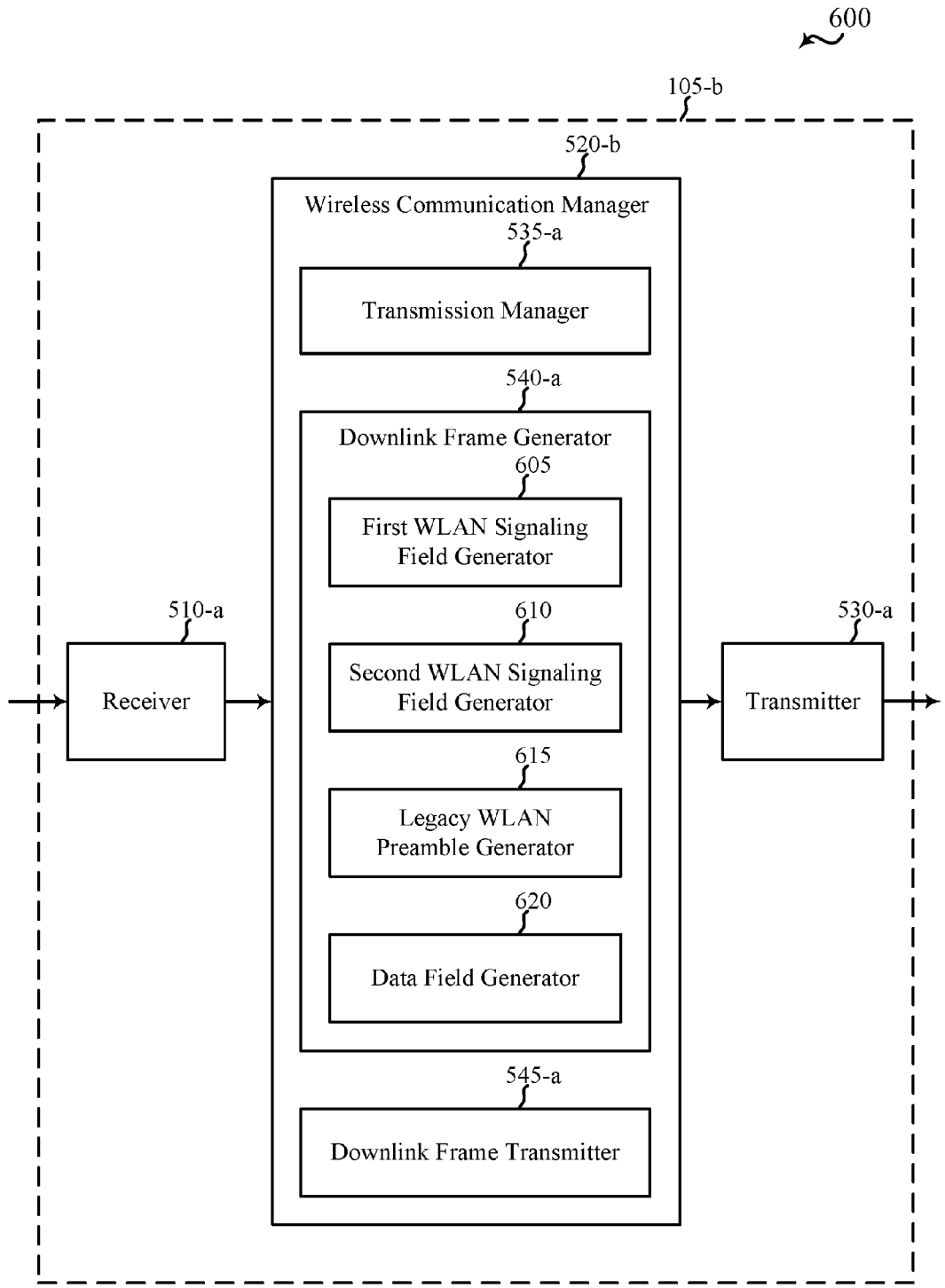
FIG. 6 shows a block diagram of an apparatus for use in wireless communication, in accordance with various aspects of the present disclosure.

FIG. 6 shows a block diagram 600 of an apparatus 105-*b* for use in wireless communication, in accordance with various aspects of the present disclosure. In some examples, the apparatus 105-*b* may be an example of aspects of the APs 105 described with reference to FIG. 1. The apparatus 105-*b* may also be or include a processor (not shown). The apparatus 105-*b* may include a receiver 510-*a*, a wireless communication manager 520-*b*, and/or a transmitter 530-*a*. Each of these components may be in communication with each other.

In some examples, the receiver 510-*a*, wireless communication manager 520-*b*, and transmitter 530-*a* may be respective examples of the receiver 510, wireless communication manager 520-*a*, and transmitter 530 described with reference to FIG. 5. As shown in FIG. 6, the wireless communication manager 520-*b* may include a transmission manager 535-*a*, a downlink frame generator 540-*a*, and/or a downlink frame transmitter 545-*a*. The downlink frame generator 540-*a* may include a first WLAN signaling field generator 605, a second WLAN signaling field generator 610, a legacy WLAN preamble generator 615, and/or a data field generator 620. In some examples, part or all of the downlink frame transmitter 545-*a* may be incorporated into the transmitter 530-*a*.

The transmission manager 535-*a* may be used to identify a number of stations to receive data from the apparatus 105-*b*.

The downlink frame generator 540-*a* may be used to generate a downlink frame to transmit data to a number of stations identified by the transmission manager 535-*a*. The downlink frame may include a first WLAN signaling field directed to the identified number of stations, a second WLAN signaling field directed to the identified number of stations, a second WLAN signaling field directed to stations other than the number of stations that are identified to receive data from the access point (and in some cases, to the identified number of stations), a legacy WLAN preamble field, a repeated legacy WLAN signaling field, and/or a data field. The downlink frame may also include an HE-STF and/or HE-LTFs. The first WLAN signaling field may include a first segment and/or a second segment. In some examples, the downlink frame may include aspects of the downlink frame described with reference to FIG. 2 and/or FIG. 3.

The first WLAN signaling field generator 605 may be used to generate a second segment of a first WLAN signaling field for a downlink frame. The second segment may include at least one information block. Each information block may be separately encoded for each of a number of stations identified by the transmission manager 535-*a*. In some examples, a delay spread protection mechanism may be used to protect each separately encoded information block. In some examples, the delay spread protection mechanism may include a frequency domain repetition, a lengthened GI, or a combination thereof.

The first WLAN signaling field generator 605 may also be used to generate a first segment of a first WLAN signaling field for a downlink frame. The first segment may include information common to each of a number of stations identified by the transmission manager 535-*a* (e.g., information usable by the identified number of stations to decode the separately encoded information blocks). In some examples, the first WLAN signaling field generator 605 may duplicate the information common to each of the identified number of stations, so that the duplicated information can be transmitted in each of a plurality of sub-bands of a shared radio frequency spectrum band.

The second WLAN signaling field generator 610 may be used to generate a second WLAN signaling field for a downlink frame. The second WLAN signaling field may include information usable by a station other than a number of stations identified by the transmission manager 535-*a* (and in some cases, information usable by the identified number of stations). In some examples, the second WLAN signaling field may signal bandwidth information, which bandwidth information may be used by a station to identify a separately encoded information block in the first WLAN signaling field (e.g., a separately encoded information block that is intended for the station). In some examples, the second WLAN signaling field may be separately encoded from the first WLAN signaling field. In some examples, a same delay spread protection mechanism may be used in each of the first segment of the first WLAN signaling field and the second WLAN signaling field. The same delay spread protection mechanism may include, for example, a time domain repetition, a frequency domain repetition, or a combination thereof.

In some examples, the first WLAN signaling field generator 605 and/or the second WLAN signaling field generator 610 may use tail-biting convolutional coding when generating a first segment of a first WLAN signaling field, a second segment of a first WLAN signaling field, a second WLAN signaling field, or a combination thereof.

The legacy WLAN preamble generator 615 may be used to generate a legacy WLAN preamble field for a downlink frame. In some examples, the legacy WLAN preamble field may include L-STF information, L-LTF information, and/or legacy signaling information. The legacy signaling information may indicate whether a delay spread protection mechanism is used in the first segment of the first WLAN signaling field.

The data field generator 620 may be used to generate a data field for a downlink frame. The data field may include data for each of a number of stations identified by the transmission manager 535-*a*.

The downlink frame transmitter 545-*a* may be used to transmit a downlink frame generated by the downlink frame generator 540-*a* to a number of stations identified by the transmission manager 535-*a*. The downlink frame may be transmitted via the transmitter 530-*a*. In some examples, transmitting the downlink frame may include transmitting each separately encoded information block within one OFDM symbol of a first WLAN signaling field and/or in one sub-band of a shared radio frequency spectrum band. In some examples (e.g., when a higher MCS is used for an OFDM symbol), at least two separately encoded information blocks may be transmitted in the same OFDM symbol and sub-band. In some examples, transmitting the downlink frame may include transmitting data for each of the identified number of stations in a data field, with the separately encoded information block and data for a station being transmitted in a same sub-band of the shared radio frequency spectrum band. In some examples, fields of the downlink frame may be transmitted in the following order: legacy WLAN preamble field, repeated legacy WLAN signaling field, second WLAN signaling field, first WLAN signaling field, HE-STF, HE-LTFs, data field.

In some embodiments, a first WLAN signaling field may include a first OFDM symbol associated with a first MCS and a second OFDM symbol associated with a second MCS, with the second MCS being different from the first MCS. In these embodiments, the downlink frame transmitter 545-*a* may map a first separately encoded information block for a first station (i.e., an information block to be transmitted using the first MCS) to the first OFDM symbol, and map a second separately encoded information block for a second station (i.e., an information block to be transmitted using the second MCS) to the second OFDM symbol. In some cases, separately encoded information blocks for other stations may also be mapped to the first OFDM symbol or the second OFDM symbol. In some cases, the first WLAN signaling field may include additional OFDM symbols, with each of the additional OFDM symbols being associated with the first MCS, the second MCS, or at least one additional MCS. In some examples (e.g., when a higher MCS is used for an OFDM symbol), at least two separately encoded information blocks may be mapped to a single OFDM symbol and sub-band.

Figure 7:
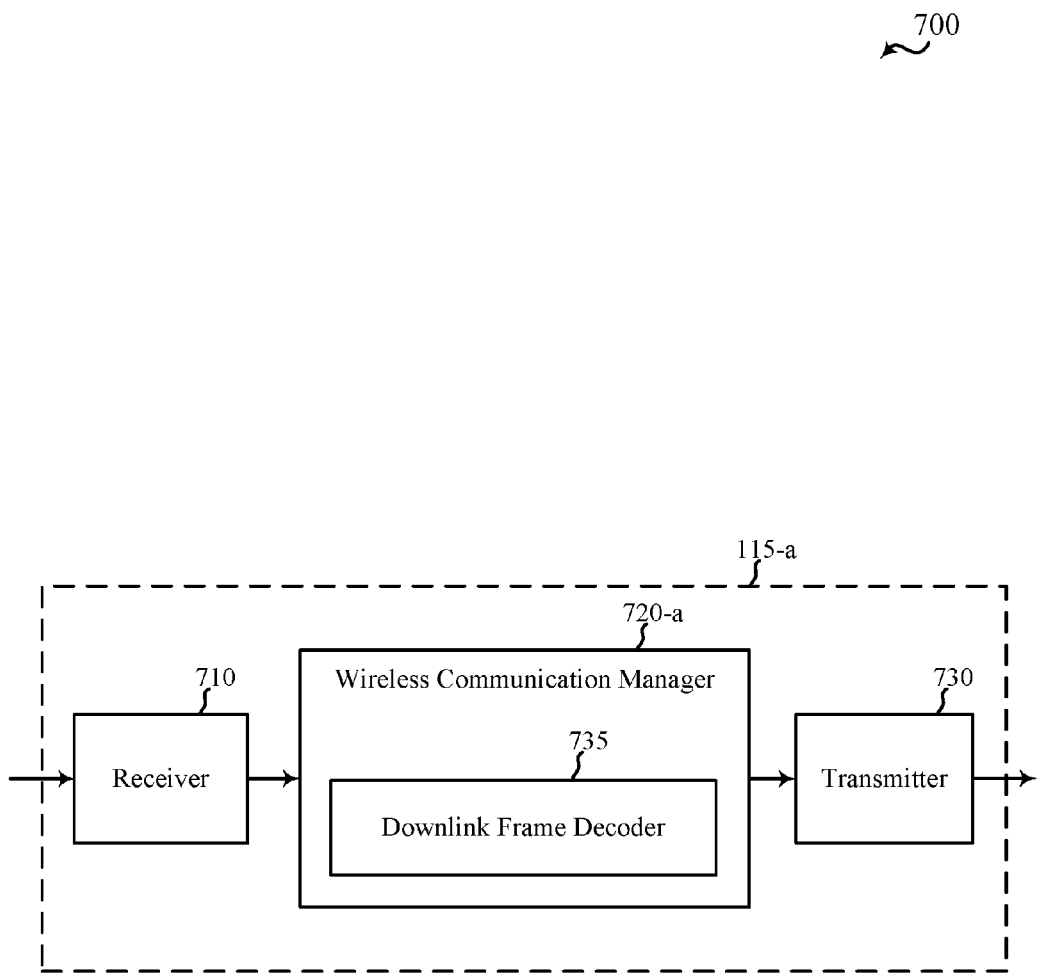
FIG. 7 shows a block diagram of an apparatus for use in wireless communication, in accordance with various aspects of the present disclosure.

FIG. 7 shows a block diagram 700 of an apparatus 115-*a* for use in wireless communication, in accordance with various aspects of the present disclosure. In some examples, the apparatus 115-*a* may be an example of aspects of the stations 115 described with reference to FIG. 1. The apparatus 115-*a* may also be or include a processor (not shown). The apparatus 115-*a* may include a receiver 710, a station wireless communication manager 720-*a*, and/or a transmitter 730. Each of these components may be in communication with each other.

The components of the apparatus 115-*a* may, individually or collectively, be implemented using at least one ASIC adapted to perform some or all of the applicable functions in hardware. Alternatively, the functions may be performed by at least one other processing unit (or core), on at least one integrated circuit. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by at least one general and/or application-specific processor.

In some examples, the receiver 710 may include at least one RF receiver. The receiver 710 and/or RF receiver may be used to receive various types of data and/or control signals (i.e., transmissions) over at least one communication link of a wireless communication system, such as at least one communication link of the WLAN network 100 described with reference to FIG. 1.

In some examples, the transmitter 730 may include at least one RF transmitter. The transmitter 730 or RF transmitter may be used to transmit various types of data and/or control signals (i.e., transmissions) over at least one communication link of a wireless communication system, such as at least one communication link of the WLAN network 100 described with reference to FIG. 1.

In some examples, the station wireless communication manager 720-a may be used to manage at least one aspect of wireless communication for the apparatus 115-a. The station wireless communication manager 720-a may include a downlink frame decoder 735. In some examples, part or all of the downlink frame decoder 735 may be incorporated into the receiver 710.

The downlink frame decoder 735 may be used to receive a downlink frame in a shared radio frequency spectrum band. The downlink frame may include at least a first WLAN signaling field and a second WLAN signaling field. The first WLAN signaling field and the second WLAN signaling field may be separately encoded. The second WLAN signaling field may include a first segment having information common to a number of stations and a second segment having separately encoded information blocks for each of the number of stations. In some examples, the downlink frame may include aspects of the downlink frame described with reference to FIG. 2 and/or FIG. 3. The downlink frame decoder 735 may be used to decode a separately encoded information block for the station using information received in the first segment of the second WLAN signaling field. In some examples, the downlink frame decoder 735 may also decode the separately encoded information block using information received in the first WLAN signaling field.

Figure 8:
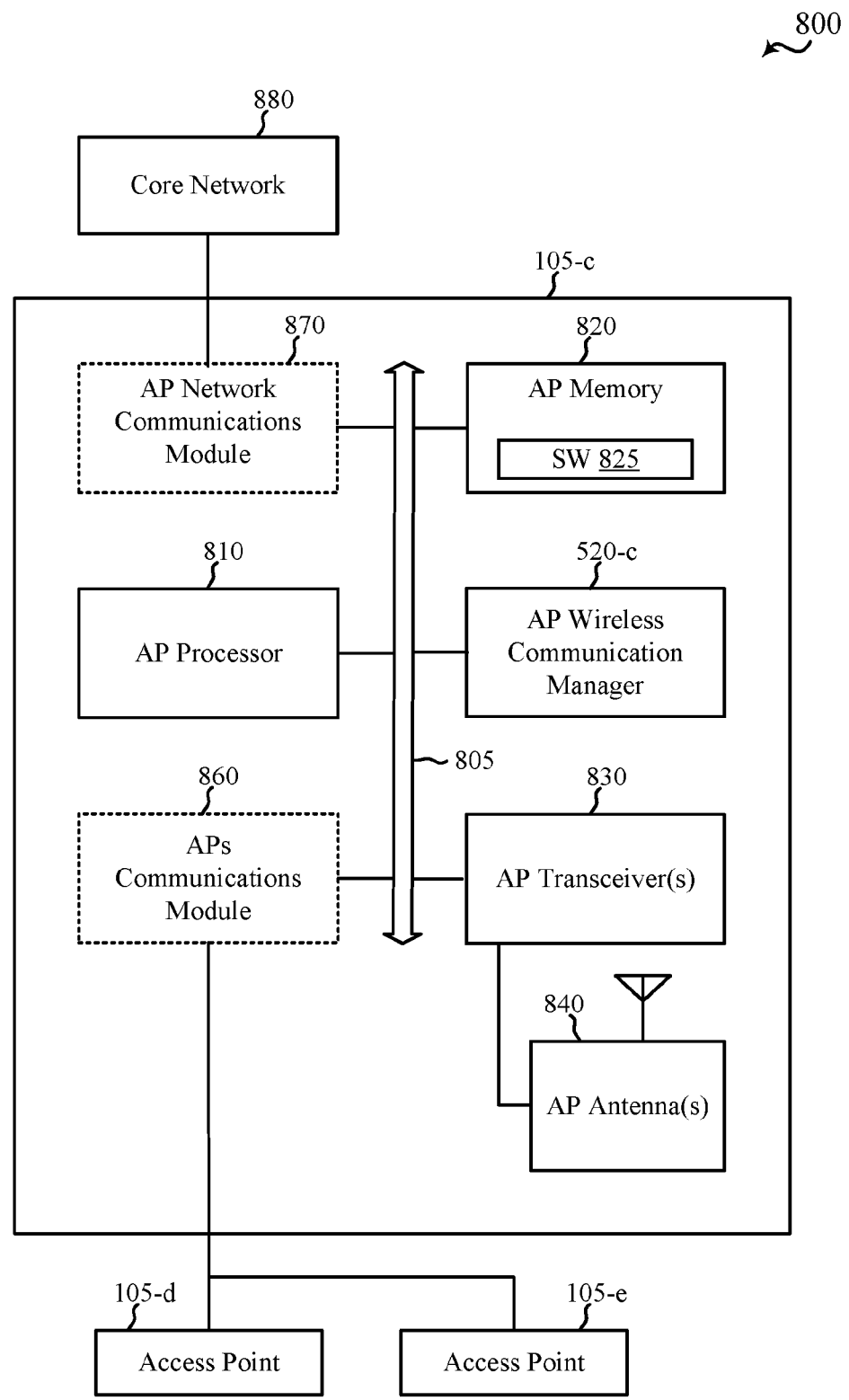
FIG. 8 shows a block diagram of a wireless communication system, in accordance with various aspects of the present disclosure.

Turning to FIG. 8, a diagram 800 is shown that illustrates an AP 105-c to send and receive WLAN frames conforming to an IEEE 802.11 standard, including WLAN frames described above with respect to FIGS. 2-4, as well as encode and decode such frames. In some aspects, the AP 105-c may be an example of the APs or apparatuses 105 of FIGS. 1, 5, and 6. The AP 105-c may include an AP processor 810, an AP memory 820, at least one AP transceiver 830, and/or at least one AP antenna 840, and/or an AP wireless communication manager 520-c. The AP wireless communication manager 520-c may be an example of the AP wireless communication manager (or wireless communication manager) of FIGS. 1, 5, and 6. In some examples, the AP 105-c may also include one or both of an APs communications module 860 and a network communications module 870. Each of these modules may be in communication with each other, directly or indirectly, over at least one bus 805.

The AP memory 820 may include random access memory (RAM) and/or read-only memory (ROM). The memory 820 may also store computer-readable, computer-executable software (SW) code 825 containing instructions that may, when executed, cause the AP processor 810 to perform various functions described herein for wireless communication, including generation and/or transmission of a downlink frame and/or reception of an uplink frame. Alternatively, the software code 825 may not be directly executable by the AP processor 810 but may cause the AP 105-c, e.g., when compiled and executed, to perform functions described herein.

The AP processor 810 may include an intelligent hardware device, e.g., a central processing unit (CPU), a microcontroller, an ASIC, etc. The AP processor 810 may process information received through the AP transceivers 830, the APs communications module 860, and/or the AP network communications module 870. The AP processor 810 may also process information to be sent to the AP transceiver(s) 830 for transmission through the AP antennas 840, to the APs communications module 860, and/or to the AP network communications module 870. The AP processor 810 may handle, alone or in connection with the AP wireless communication manager 520-c, various aspects related to generating and/or transmitting a downlink frame and/or receiving an uplink frame.

The AP transceivers 830 may include a modem to modulate the packets and provide the modulated packets to the AP antennas 840 for transmission, and to demodulate packets received from the AP antennas 840. The AP transceivers 830 may be implemented as at least one transmitter and at least one separate receiver. The AP transceivers 830 may communicate bi-directionally, via the AP antennas 840, with at least one station 115, as illustrated in FIG. 1, for example. The AP 105-c may typically include multiple AP antennas 840 (e.g., an antenna array). The AP 105-c may communicate with a core network 880 through the AP network communications module 870. The AP 105-c may communicate with other APs, such as the AP 105-d and/or the AP 105-e, using an APs communications module 860.

The AP wireless communication manager 520-c may manage communications with stations and/or other devices as illustrated in the WLAN network 100 of FIG. 1. The AP wireless communication manager 520-c may be a component of the AP 105-c in communication with some or all of the other components of the AP 105-c over the at least one bus 805. Alternatively, functionality of the AP wireless communication manager 520-c may be implemented as a component of the AP transceivers 830, as a computer program product, and/or as at least one controller element of the AP processor 810.

The components of the AP 105-c may implement aspects discussed above with respect FIGS. 1-6, and those aspects may not be repeated here for the sake of brevity. Moreover, the components of the AP 105-c may implement aspects discussed below with respect to FIGS. 10 and 11, and those aspects may not be repeated here also for the sake of brevity.

Figure 9:
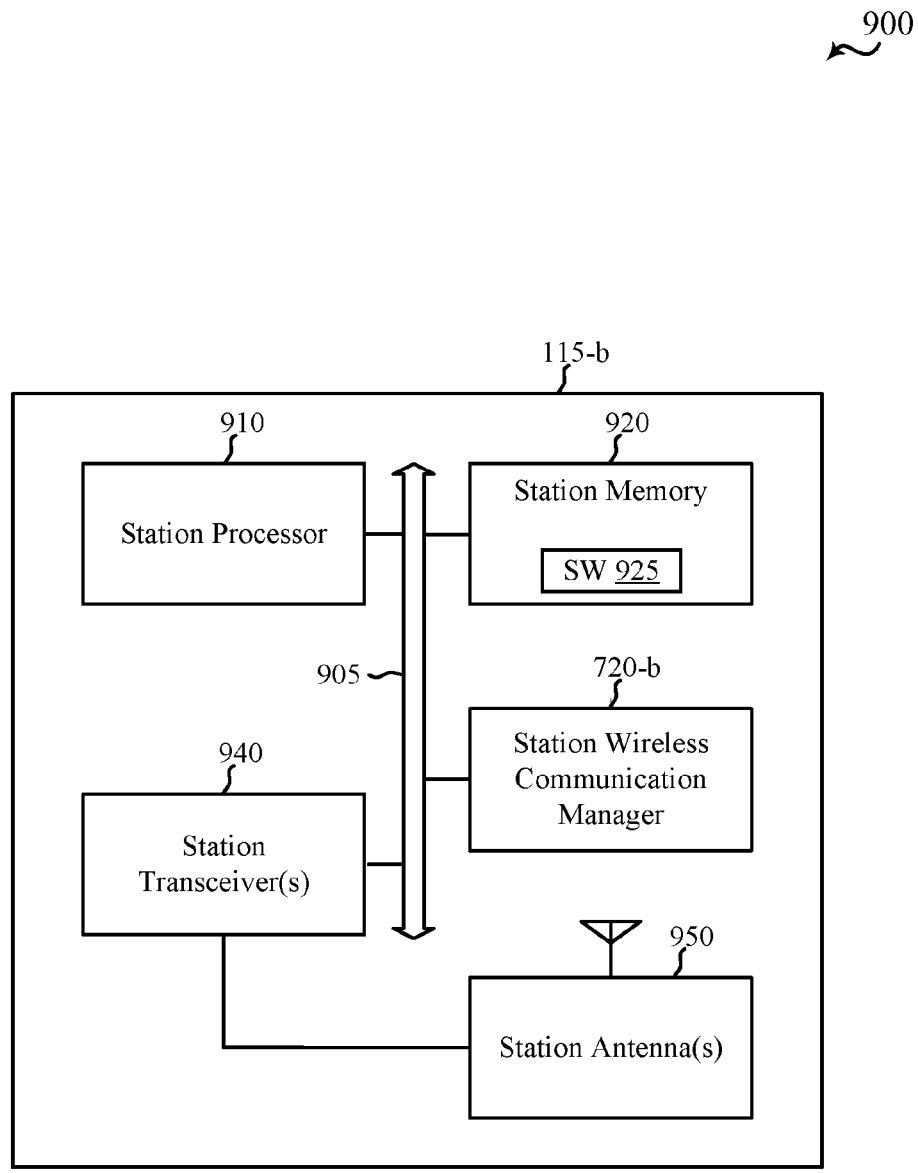
FIG. 9 shows a block diagram of a station for use in wireless communication, in accordance with various aspects of the present disclosure.

Turning to FIG. 9, a diagram 900 is shown that illustrates a station 115-b to send and receive WLAN frames conforming to an IEEE 802.11 standard, including WLAN frames described above with respect to FIGS. 2-4, as well as encode and decode such frames. The station 115-b may have various other configurations and may be included or be part of a personal computer (e.g., laptop computer, netbook computer, tablet computer, etc.), a cellular telephone, a PDA, a digital video recorder (DVR), an internet appliance, a gaming console, an e-readers, etc. The station 115-*b* may have an internal power supply (not shown), such as a small battery, to facilitate mobile operation. The station 115-*b* may be an example of the stations or apparatuses 115 of FIGS. 1 and 7.

The station 115-*b* may include a station processor 910, a station memory 920, at least one station transceiver 940, at least one station antenna 950, and/or a station wireless communication manager 720-*b*. The station wireless communication manager 720-*b* may be an example of the station wireless communication manager 720 of FIGS. 1 and 7. Each of these modules may be in communication with each other, directly or indirectly, over at least one bus 905.

The station memory 920 may include RAM and/or ROM. The station memory 920 may store computer-readable, computer-executable SW code 925 containing instructions that may, when executed, cause the station processor 910 to perform various functions described herein for wireless communication, including reception of a downlink frame and/or generation and/or transmission of an uplink frame. Alternatively, the software code 925 may not be directly executable by the station processor 910 but may cause the station 115-*b* (e.g., when compiled and executed) to perform functions described herein.

The station processor 910 may include an intelligent hardware device, e.g., a CPU, a microcontroller, an ASIC, etc. The station processor 910 may process information received through the station transceivers 940 and/or to be sent to the station transceivers 940 for transmission through the station antennas 950. The station processor 910 may handle, alone or in connection with the station wireless communication manager 720-*b*, various aspects related to receiving a downlink frame and/or generating and/or transmitting an uplink frame.

The station transceivers 940 may communicate bi-directionally, via the station antennas 950, with at least one AP 105, as illustrated in FIG. 1, for example. The station transceivers 940 may be implemented as at least one transmitter and at least one separate receiver. The station transceivers 940 may include a modem to modulate the packets and provide the modulated packets to the station antennas 950 for transmission, and to demodulate packets received from the station antennas 950. While the station 115-*b* may include a single antenna, there may be aspects in which the station 115-*b* may include multiple station antennas 950.

The station wireless communication manager 720-*b* may manage communications with APs and/or other devices as illustrated in the WLAN network 100 of FIG. 1. The station wireless communication manager 720-*b* may be a component of the station 115-*b* in communication with some or all of the other components of the station 115-*b* over the at least one bus 905. Alternatively, functionality of the station wireless communication manager 720-*b* may be implemented as a component of the station transceivers 940, as a computer program product, and/or as at least one controller element of the station processor 910.

The components of the station 115-*b* may implement aspects discussed above with respect to FIGS. 1-4 and 7, and those aspects may not be repeated here for the sake of brevity. Moreover, the components of the station 115-*b* may implement aspects discussed below with respect to FIG. 12, and those aspects may not be repeated here also for the sake of brevity.

Figure 10:
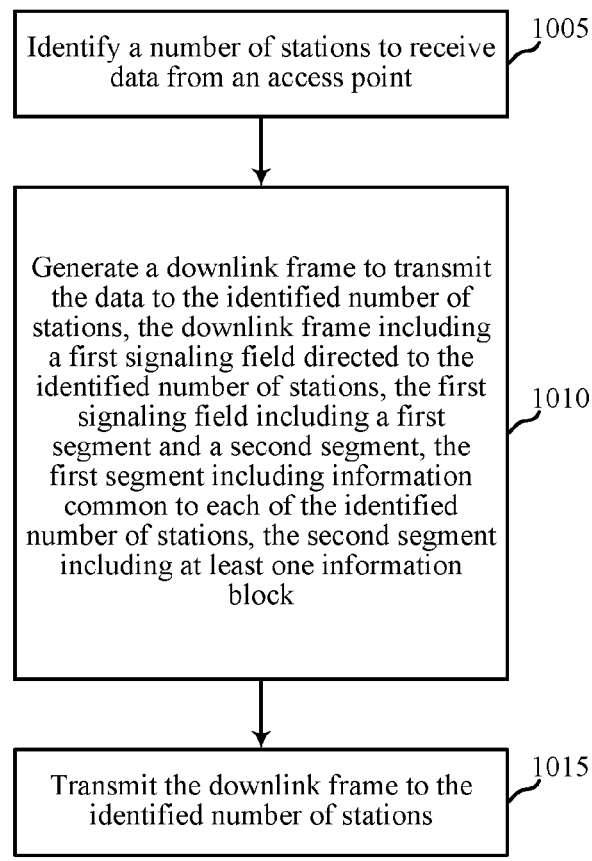
FIG. 10 is a flow chart illustrating an example of a method for wireless communication, in accordance with various aspects of the present disclosure.

FIG. 10 is a flow chart illustrating an example of a method 1000 for wireless communication, in accordance with various aspects of the present disclosure. For clarity, the method 1000 is described below with reference to aspects of the access points or apparatuses 105 described with reference to FIGS. 1, 5, 6, and 8. In some examples, an access point and/or apparatus may execute sets of codes to control the functional elements of the access point and/or apparatus to perform the functions described below. Additionally or alternatively, the access point and/or apparatus may perform the functions described below using special-purpose hardware.

At block 1005, the method 1000 may include identifying a number of stations to receive data from the access point. At block 1010, the method 1000 may include generating a downlink frame to transmit the data to the identified number of stations. The downlink frame may include a first signaling field (e.g., a WLAN signaling field) directed to the identified number of stations. The first signaling field may include a first segment and/or a second segment. The first segment may include information common to each of the identified number of stations. The second segment may include at least one information block. At block 1015, the method 1000 may include transmitting the downlink frame to the identified number of stations.

The operations at blocks 1005, 1010, and 1015 may be performed, for example, using the wireless communication manager 520 described with reference to FIG. 1, 5, 6, or 8. In some examples, the downlink frame may include aspects of the downlink frame described with reference to FIG. 2 and/or FIG. 3.

Thus, the method 1000 may provide for wireless communication. It should be noted that the method 1000 is just one implementation and that the operations of the method 1000 may be rearranged or otherwise modified such that other implementations are possible.

Figure 11:
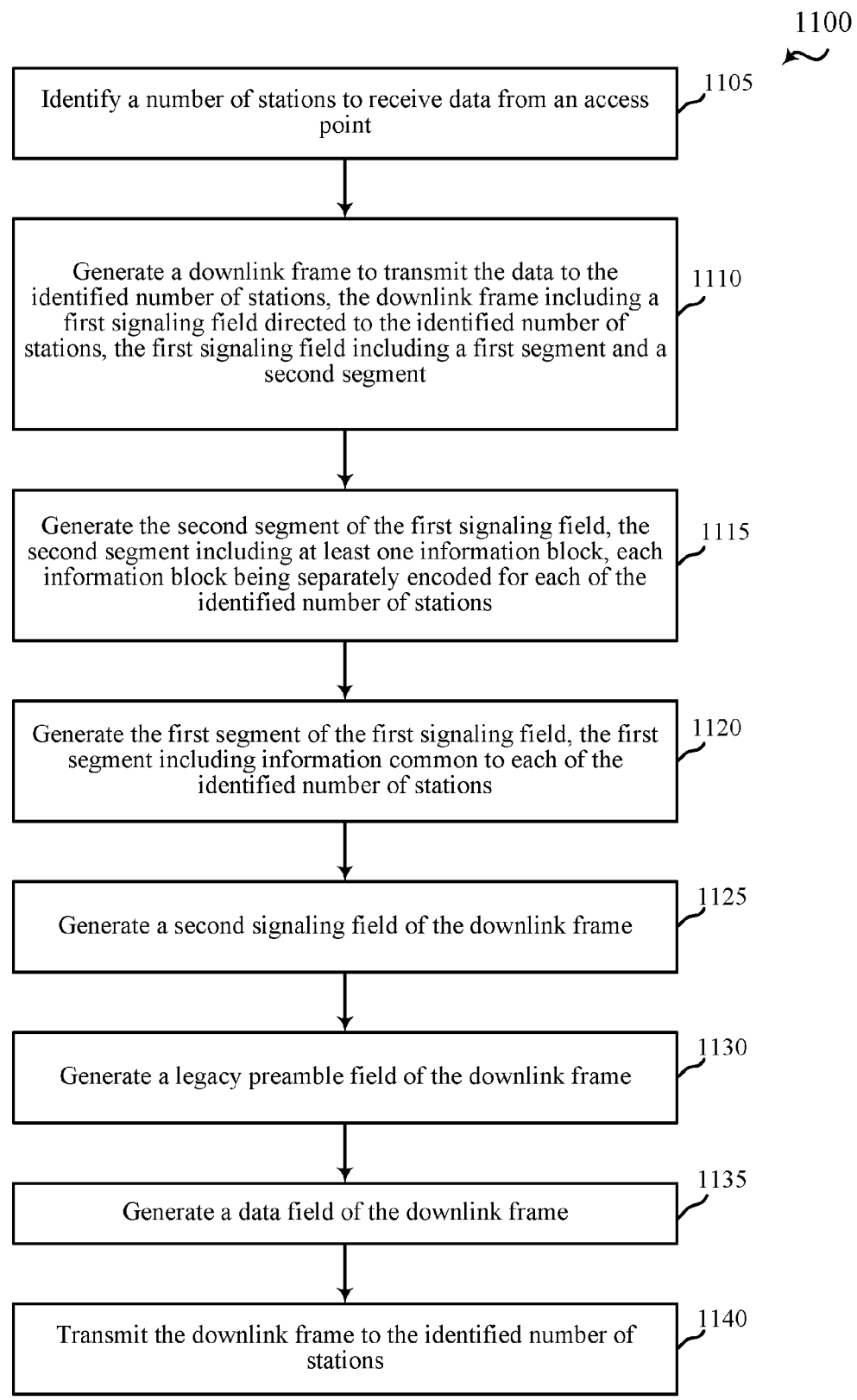
FIG. 11 is a flow chart illustrating an example of a method for wireless communication, in accordance with various aspects of the present disclosure.

FIG. 11 is a flow chart illustrating an example of a method 1100 for wireless communication, in accordance with various aspects of the present disclosure. For clarity, the method 1100 is described below with reference to aspects of the access points or apparatuses 105 described with reference to FIGS. 1, 5, 6, and 8. In some examples, an access point and/or apparatus may execute sets of codes to control the functional elements of the access point and/or apparatus to perform the functions described below. Additionally or alternatively, the access point and/or apparatus may perform the functions described below using special-purpose hardware.

At block 1105, the method 1100 may include identifying a number of stations to receive data from the access point.

At block 1110, the method 1100 may include generating a downlink frame to transmit the data to the identified number of stations. The downlink frame may include a first WLAN signaling field directed to the identified number of stations, a second WLAN signaling field directed to stations other than the number of stations that are identified to receive data from the access point (and in some cases, to the identified number of stations), a legacy WLAN preamble field, a repeated legacy WLAN signaling field, and/or a data field. The downlink frame may also include an HE-STF and/or HE-LTFs. The first WLAN signaling field may include a first segment and/or a second segment.

At block 1115, the method 1100 may include generating the second segment of the first WLAN signaling field. The second segment may include at least one information block. Each information block may be separately encoded for each of the identified number of stations. In some examples, a delay spread protection mechanism may be used to protect each separately encoded information block. In some examples, the delay spread protection mechanism may include a frequency domain repetition, a lengthened GI, or a combination thereof.

At block 1120, the method 1100 may include generating the first segment of the first WLAN signaling field. The first segment may include information common to each of the identified number of stations (e.g., information usable by the identified number of stations to decode the separately encoded information blocks). In some examples, the operation(s) at block 1120 may include duplicating the information common to each of the identified number of stations, so that the duplicated information can be transmitted in each of a plurality of sub-bands of a shared radio frequency spectrum band.

At block 1125, the method 1100 may include generating the second WLAN signaling field. The second WLAN signaling field may include information usable by a station other than the identified number of stations (and in some cases, information usable by the identified number of stations). In some examples, the second WLAN signaling field may signal bandwidth information, which bandwidth information may be used by a station to identify a separately encoded information block in the first WLAN signaling field (e.g., a separately encoded information block that is intended for the station). In some examples, the second WLAN signaling field may be separately encoded from the first WLAN signaling field. In some examples, a same delay spread protection mechanism may be used in each of the first segment of the first WLAN signaling field and the second WLAN signaling field. The same delay spread protection mechanism may include, for example, a time domain repetition, a frequency domain repetition, or a combination thereof.

In some examples, a tail-biting convolutional coding may be used in the first segment of the first WLAN signaling field, in the second segment of the first WLAN signaling field, in the second WLAN signaling field, or in a combination thereof.

At block 1130, the method 1100 may include generating the legacy WLAN preamble field. In some examples, the legacy WLAN preamble field may include L-STF information, L-LTF information, and/or legacy signaling information. The legacy signaling information may indicate whether a delay spread protection mechanism is used in the first segment of the first WLAN signaling field.

At block 1135, the method 1100 may include generating the data field. The data field may include data for each of the identified number of stations.

At block 1140, the method 1100 may include transmitting the downlink frame to the identified number of stations. In some examples, the transmitting may include transmitting each of the separately encoded information blocks within one OFDM symbol of the first WLAN signaling field and/or in one sub-band of a shared radio frequency spectrum band. In some examples (e.g., when a higher MCS is used for an OFDM symbol), at least two separately encoded information blocks may be transmitted in the same OFDM symbol and sub-band. In some examples, the transmitting may include transmitting data for each of the identified number of stations in the data field, with the separately encoded information block and data for a station being transmitted in a same sub-band of the shared radio frequency spectrum band. In some examples, the fields of the downlink frame may be transmitted in the following order: legacy WLAN preamble field, repeated legacy WLAN signaling field, second WLAN signaling field, first WLAN signaling field, HE-STF, HE-LTFs, data field.

In some embodiments, the first WLAN signaling field may include a first OFDM symbol associated with a first MCS and a second OFDM symbol associated with a second MCS, with the second MCS being different from the first MCS. In these embodiments, the method 1100 may include mapping a first separately encoded information block for a first station (i.e., an information block to be transmitted using the first MCS) to the first OFDM symbol, and mapping a second separately encoded information block for a second station (i.e., an information block to be transmitted using the second MCS) to the second OFDM symbol. In some cases, separately encoded information blocks for other stations may also be mapped to the first OFDM symbol or the second OFDM symbol. In some cases, the first WLAN signaling field may include additional OFDM symbols, with each of the additional OFDM symbols being associated with the first MCS, the second MCS, or at least one additional MCS. In some examples (e.g., when a higher MCS is used for an OFDM symbol), at least two separately encoded information blocks may be mapped to a single OFDM symbol and sub-band.

The operations at blocks 1105, 1110, 1115, 1120, 1125, 1130, 1135, and 1140 may be performed, for example, using the wireless communication manager 520 described with reference to FIG. 1, 5, 6, or 8. In some examples, the downlink frame may include aspects of the downlink frame described with reference to FIG. 2 and/or FIG. 3.

Thus, the method 1100 may provide for wireless communication. It should be noted that the method 1100 is just one implementation and that the operations of the method 1100 may be rearranged or otherwise modified such that other implementations are possible.

Figure 12:
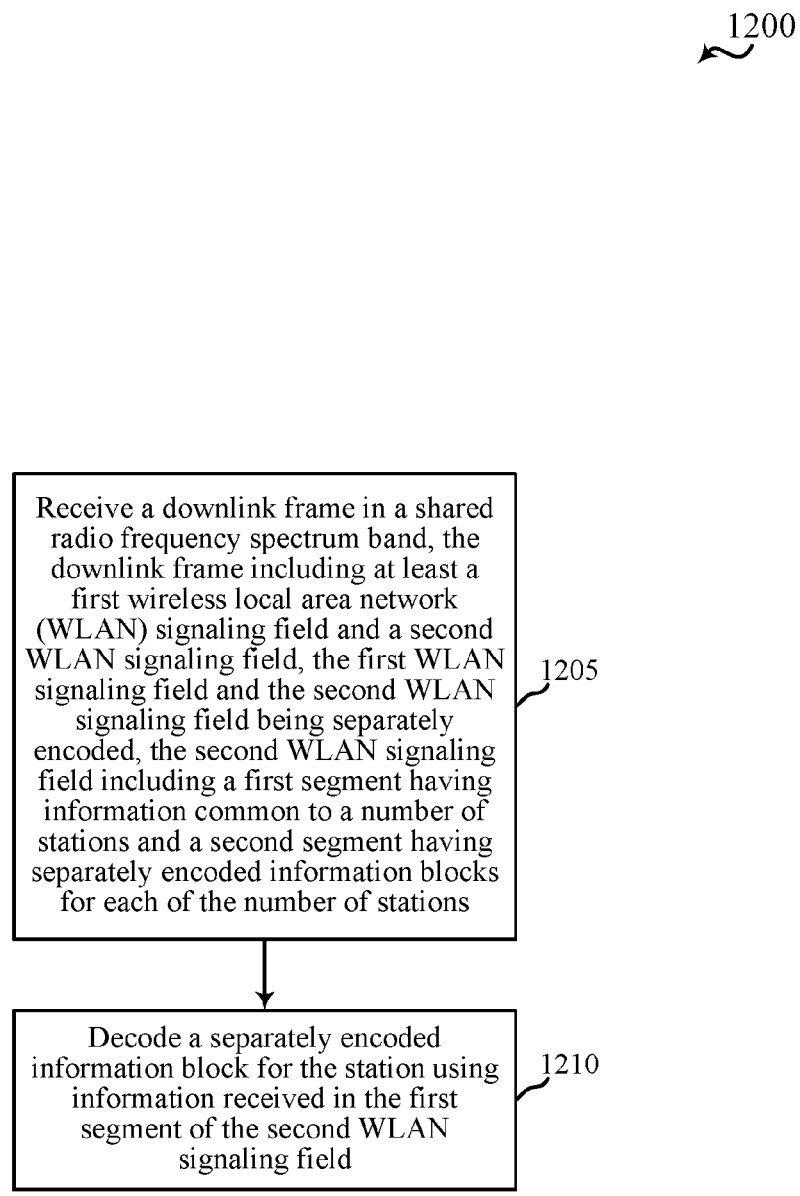
FIG. 12 is a flow chart illustrating an example of a method for wireless communication, in accordance with various aspects of the present disclosure.

FIG. 12 is a flow chart illustrating an example of a method 1200 for wireless communication, in accordance with various aspects of the present disclosure. For clarity, the method 1200 is described below with reference to aspects of the stations or apparatuses 115 described with reference to FIGS. 1, 7, and 9. In some examples, a station and/or apparatus may execute sets of codes to control the functional elements of the station and/or apparatus to perform the functions described below. Additionally or alternatively, the station and/or apparatus may perform the functions described below using special-purpose hardware.

At block 1205, the method 1200 may include receiving a downlink frame in a shared radio frequency spectrum band. The downlink frame may include at least a first WLAN signaling field and a second WLAN signaling field. The first WLAN signaling field and the second WLAN signaling field may be separately encoded. The second WLAN signaling field may include a first segment having information common to a number of stations and a second segment having separately encoded information blocks for each of the number of stations. At block 1210, the method 1200 may include decoding a separately encoded information block for the station using information received in the first segment of the second WLAN signaling field. In some examples, the separately encoded information block may also be decoded using information received in the first WLAN signaling field.

The operations at blocks 1205 and 1210 may be performed, for example, using the station wireless communication manager 720 described with reference to FIG. 1, 7 or 9. In some examples, the downlink frame may include aspects of the downlink frame described with reference to FIG. 2 and/or FIG. 3.

Thus, the method 1200 may provide for wireless communication. It should be noted that the method 1200 is just one implementation and that the operations of the method 1200 may be rearranged or otherwise modified such that other implementations are possible.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, at least one microprocessor in conjunction with a DSP core, or any other such configuration.

The functions described herein may be implemented in hardware, software executed by a processor, firmware, or any combination thereof. If implemented in software executed by a processor, the functions may be stored on or transmitted as instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of") indicates a disjunctive list such that, for example, a list of "A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Throughout this disclosure the term "example" or "exemplary" indicates an example or instance and does not imply or require any preference for the noted example. Thus, the disclosure is not to be limited to the examples and designs described herein but is to be accorded the broadest scope consistent with the principles and novel features disclosed herein.

What is claimed is:

1. A method for wireless communication at an access point, comprising:
    identifying a number of stations to receive data from the access point;
    generating a downlink frame to transmit the data to the identified number of stations, the downlink frame comprising a first signaling field directed to the identified number of stations and a second signaling field, the first signaling field comprising a first segment and a second segment, the first segment comprising information common to each of the identified number of stations, the second segment comprising an information block for at least one station of the identified number of stations, the information block for the at least one station being separately encoded from the first segment, the second signaling field comprising an information block including bandwidth information, the information block including the bandwidth information being separately encoded from information of the first signaling field; and
    transmitting the downlink frame to the identified number of stations.

2. The method of claim 1, further comprising:
    duplicating the information common to each of the identified number of stations; and
    transmitting the duplicated information in at least two sub-bands of a plurality of sub-bands of a shared radio frequency spectrum band.

3. The method of claim 1, further comprising:
transmitting the downlink frame including the separately encoded information block and an additional separately encoded information block in one sub-band of a plurality of sub-bands of a shared radio frequency spectrum band.

4. The method of claim 1, wherein the downlink frame comprises a data field, the method further comprising:
transmitting the downlink frame including data for each of the identified number of stations in the data field, wherein the separately encoded information block and the data are transmitted in a same sub-band of a plurality of sub-bands of a shared radio frequency spectrum band.

5. The method of claim 1, wherein the signaling field is a wireless local area network (WLAN) signaling field.

6. The method of claim 1, further comprising:
using a same delay spread protection mechanism in each of the first segment of the first signaling field and the second signaling field.

7. The method of claim 6, wherein the same delay spread protection mechanism comprises a time domain repetition, or a frequency domain repetition, or a combination thereof.

8. The method of claim 1, further comprising:
indicating, in legacy signaling information of the downlink frame, a use of a delay spread protection mechanism in the first segment of the first signaling field.

9. The method of claim 1, further comprising:
transmitting the separately encoded information block within one orthogonal frequency division multiplexing (OFDM) symbol of the first signaling field.

10. The method of claim 9, further comprising:
transmitting the separately encoded information block in one sub-band of a plurality of sub-bands of a shared radio frequency spectrum band.

11. The method of claim 10, wherein each sub-band of the plurality of sub-bands has a bandwidth of 20 Megahertz (MHz).

12. The method of claim 10, wherein the second segment comprises an additional separately encoded information block for at least another station of the identified number of stations, the method further comprising:
transmitting the additional separately encoded information block in the one sub-band in the one OFDM symbol.

13. The method of claim 1, further comprising:
mapping the separately encoded information block for the at least one station to a first orthogonal frequency division multiplexing (OFDM) symbol; and
mapping a second separately encoded information block for a second station to a second OFDM symbol, the second OFDM symbol associated with a modulation and coding scheme (MCS) different from an MCS associated with the first OFDM symbol.

14. The method of claim 13, further comprising:
transmitting the separately encoded information block in one sub-band of a plurality of sub-bands of a shared radio frequency spectrum band and the second separately encoded information block in another sub-band of the plurality of sub-bands.

15. The method of claim 13, wherein the separately encoded information block is transmitted in a first sub-band, the method further comprising:
mapping a third separately encoded information block for a third station to the first OFDM symbol and the first sub-band of the plurality of sub-bands.

16. The method of claim 1, further comprising:
using a delay spread protection mechanism to protect the separately encoded information block in the second segment of the first signaling field.

17. The method of claim 16, wherein the delay spread protection mechanism comprises a frequency domain repetition, or a lengthened guard interval (GI), or a combination thereof.

18. The method of claim 1,
wherein the bandwidth information is usable by the at least one station of the identified number of stations to identify the separately encoded information block in the first signaling field that is intended for the at least one station.

19. The method of claim 1,
wherein the second signaling field comprises information usable by a station other than the identified number of stations.

20. The method of claim 1, further comprising:
transmitting, in the first segment of the first signaling field, information usable by the at least one station of the identified number of stations to decode the separately encoded information block.

21. The method of claim 1, further comprising:
using tail-biting convolutional coding in the first segment of the first signaling field, or the second segment of the first signaling field, or the second signaling field of the downlink frame, or a combination thereof.

22. An apparatus for wireless communication at an access point, comprising:
means for identifying a number of stations to receive data from the access point;
means for generating a downlink frame to transmit the data to the identified number of stations, the downlink frame comprising a first signaling field directed to the identified number of stations and a second signaling field, the first signaling field comprising a first segment and a second segment, the first segment comprising information common to each of the identified number of stations, the second segment comprising an information block for at least one station of the identified number of stations, the information block for the at least one station being separately encoded from the first segment, the second signaling field comprising an information block including bandwidth information, the information block including the bandwidth information being separately encoded from information of the first signaling field; and
means for transmitting the downlink frame to the identified number of stations.

23. The apparatus of claim 22, wherein the signaling field is a wireless local area network (WLAN) signaling field.

24. The apparatus of claim 22, further comprising:
means for duplicating the information common to each of the identified number of stations; and
means for transmitting the duplicated information in at least two sub-bands of a plurality of sub-bands of a shared radio frequency spectrum band.

25. The apparatus of claim 22, further comprising:
means for transmitting the downlink frame including the separately encoded information block and an additional separately encoded information block in one sub-band of a shared radio frequency spectrum band.

26. The apparatus of claim 22, wherein the downlink frame comprises a data field, the apparatus further comprising:
means for transmitting the downlink frame including data for each of the identified number of stations in the data field, wherein the separately encoded information block and the data are transmitted in a same sub-band of a plurality of sub-bands of a shared radio frequency spectrum band.

27. The apparatus of claim 22, further comprising:
means for using a same delay spread protection mechanism in each of the first segment of the first signaling field and the second signaling field.

28. The apparatus of claim 27, wherein the same delay spread protection mechanism comprises a time domain repetition, or a frequency domain repetition, or a combination thereof.

29. The apparatus of claim 22, further comprising:
means for indicating, in legacy signaling information of the downlink frame, a use of a delay spread protection mechanism in the first segment of the first signaling field.

30. The apparatus of claim 22, further comprising:
means for transmitting the separately encoded information block within one orthogonal frequency division multiplexing (OFDM) symbol of the first signaling field.

31. The apparatus of claim 30, further comprising:
means for transmitting the separately encoded information block in at least one sub-band of a plurality of sub-bands of a shared radio frequency spectrum band.

32. The apparatus of claim 31, wherein each sub-band of the plurality of sub-bands has a bandwidth of 20 Megahertz (MHz).

33. The apparatus of claim 31, wherein the second segment comprises an additional separately encoded information block for at least another station of the identified number of stations, the apparatus further comprising:
means for transmitting the additional separately encoded information block in the one sub-band in the one additional OFDM symbol.

34. The apparatus of claim 22, further comprising:
means for mapping the separately encoded information block for the at least one station to a first orthogonal frequency division multiplexing (OFDM) symbol; and
means for mapping a second separately encoded information block for a second station to a second OFDM symbol, the second OFDM symbol associated with a modulation and coding scheme (MCS) different from an MCS associated with the first OFDM symbol.

35. The apparatus of claim 34, further comprising:
means for transmitting the separately encoded information block in one sub-band of a plurality of sub-bands of a shared radio frequency spectrum band and the second separately encoded information block in another sub-band of the plurality of sub-bands.

36. The apparatus of claim 34, wherein the separately encoded information block is transmitted in a first sub-band, the apparatus further comprising:
means for mapping a third separately encoded information block for a third station to the first OFDM symbol and the first sub-band of a plurality of sub-bands.

37. The apparatus of claim 22, further comprising:
means for using a delay spread protection mechanism to protect the separately encoded information block in the second segment of the first signaling field.

38. The apparatus of claim 37, wherein the delay spread protection mechanism comprises a frequency domain repetition, or a lengthened guard interval (GI), or a combination thereof.

39. The apparatus of claim 22,
wherein the bandwidth information is usable by the at least one station of the identified number of stations to identify the separately encoded information block in the first signaling field that is intended for the at least one station.

40. The apparatus of claim 22,
wherein the second signaling field comprises information usable by a station other than the identified number of stations.

41. The apparatus of claim 22, further comprising:
means for transmitting, in the first segment of the first signaling field, information usable by the at least one station of the identified number of stations to decode the separately encoded information block.

42. The apparatus of claim 22, further comprising:
means for using tail-biting convolutional coding in the first segment of the first signaling field, or the second segment of the first signaling field, or the second signaling field of the downlink frame, or a combination thereof.

43. An apparatus for wireless communication at an access point, comprising:
a processor and memory communicatively coupled to the processor, the memory comprising computer-readable code, when executed by the processor, to cause:
a transmission manager to identify a number of stations to receive data from the access point;
a downlink frame generator to generate a downlink frame to transmit the data to the identified number of stations, the downlink frame comprising a first signaling field directed to the identified number of stations and a second signaling field, the first signaling field comprising a first segment and a second segment, the first segment comprising information common to each of the identified number of stations, the second segment comprising an information block for at least one station of the identified number of stations, the information block for the at least one station being separately encoded from the first segment, the second signaling field comprising an information block including bandwidth information, the information block including the bandwidth information being separately encoded from information of the first signaling field; and
a downlink frame transmitter to transmit the downlink frame to the identified number of stations.

44. The apparatus of claim 43, wherein the signaling field is a wireless local area network (WLAN) signaling field.

45. The apparatus of claim 43, wherein the downlink frame generator duplicates the information common to each of the identified number of stations, and wherein the downlink frame transmitter transmits the duplicated information in at least two sub-bands of a plurality of sub-bands of a shared radio frequency spectrum band.

46. The apparatus of claim 43, wherein the downlink frame transmitter transmits the downlink frame including the separately encoded information block and the additional separately encoded information block in one sub-band of a plurality of sub-bands of a shared radio frequency spectrum band.

47. The apparatus of claim 43, wherein the downlink frame comprises a data field, wherein the downlink frame transmitter transmits the downlink frame including data for each of the identified number of stations in the data field, wherein the separately encoded information block and the data are transmitted in a same sub-band of a plurality of sub-bands of a shared radio frequency spectrum band.

48. The apparatus of claim 43, wherein the downlink frame transmitter transmits the separately encoded information block within one orthogonal frequency division multiplexing (OFDM) symbol of the first signaling field.

49. The apparatus of claim 48, wherein the downlink frame transmitter transmits each of the separately encoded information block in one sub-band of a plurality of sub-bands of a shared radio frequency spectrum band.

50. The apparatus of claim 49, wherein the second segment comprises an additional separately encoded information block for at least another station of the identified number of stations, wherein the downlink frame transmitter transmits the additional separately encoded information block in the one OFDM symbol.

51. The apparatus of claim 43, wherein the downlink frame transmitter maps the separately encoded information block for the at least one station to a first orthogonal frequency division multiplexing (OFDM) symbol and maps a second separately encoded information block for a second station to a second OFDM symbol, the second OFDM symbol associated with a modulation and coding scheme (MCS) different from an MCS associated with the first OFDM symbol.

52. The apparatus of claim 43, wherein the downlink frame transmitter transmits, in the second signaling field of the downlink frame, information usable by a station other than the identified number of stations.

53. A non-transitory computer-readable medium storing computer-executable code for wireless communication at an access point, the code executable by a processor to:
identify a number of stations to receive data from the access point;
generate a downlink frame to transmit the data to the identified number of stations, the downlink frame comprising a first signaling field directed to the identified number of stations and a second signaling field, the first signaling field comprising a first segment and a second segment, the first segment comprising information common to each of the identified number of stations, the second segment comprising an information block for at least one station of the identified number of stations, the information block for the at least one station being separately encoded from the first segment, the second signaling field comprising an information block including bandwidth information, the information block including the bandwidth information being separately encoded from information of the first signaling field; and
transmit the downlink frame to the identified number of stations.

54. The non-transitory computer-readable medium of claim 53, wherein the code executable by the processor to transmit the downlink frame comprises code executable by the processor to transmit the downlink frame including the separately encoded information block and an additional separately encoded information block in one sub-band of a plurality of sub-bands of a shared radio frequency spectrum band.

55. A method for wireless communication at a station, comprising:
receiving a downlink frame in a shared radio frequency spectrum band, the downlink frame comprising at least a first signaling field and a second signaling field, the second signaling field comprising a first segment having information common to a number of stations and a second segment having an information block for at least one station of the number of stations, the information block for the at least one station being separately encoded from the first segment, the first signaling field comprising an information block including bandwidth information, the information block including the bandwidth information being separately encoded from information of the second signaling field, and the at least one station including the station; and
decoding the separately encoded information block for the station using information received in the first segment of the second signaling field.

56. The method of claim 55, further comprising:
decoding the separately encoded information block for the station using information received in the first signaling field.

57. The method of claim 55, further comprising:
receiving information common to the number of stations in at least two sub-bands of a plurality of sub-bands of a shared radio frequency spectrum band.

58. The method of claim 55, further comprising:
receiving the downlink frame including the separately encoded information block and an additional separately encoded information block in one sub-band of a plurality of sub-bands of a shared radio frequency spectrum band.

59. An apparatus for wireless communication at a station, comprising:
means for receiving a downlink frame in a shared radio frequency spectrum band, the downlink frame comprising at least a first signaling field and a second signaling field, the second signaling field comprising a first segment having information common to a number of stations and a second segment having an information block for at least one station of the number of stations, the information block being separately encoded from the first segment, the first signaling field comprising an information block including bandwidth information, the information block including the bandwidth information being separately encoded from information of the second signaling field, and the at least one station including the station; and
means for decoding the separately encoded information block for the station using information received in the first segment of the second signaling field.

60. The apparatus of claim 59, further comprising:
means for decoding the separately encoded information block for the station using information received in the first signaling field.

61. The apparatus of claim 59, wherein the means for receiving comprise means for receiving information common to the number of stations in at least two sub-bands of a plurality of sub-bands of a shared radio frequency spectrum band.

62. The apparatus of claim 59, wherein the means for receiving a downlink frame comprise means for receiving the downlink frame including the separately encoded information block and an additional separately encoded information block in one sub-band of a plurality of sub-bands of a shared radio frequency spectrum band.

63. An apparatus for wireless communication at a station, comprising:
a processor and memory communicatively coupled to the processor, the memory comprising computer-readable code, when executed by the processor, to cause:
a downlink frame decoder to receive a downlink frame in a shared radio frequency spectrum band, the downlink frame comprising at least a first wireless local area network (WLAN) signaling field and a second WLAN signaling field, the first WLAN signaling field and the second WLAN signaling field being separately encoded, the second WLAN signaling field comprising a first segment having information common to a number of stations and a second segment having an information block for at least one station of the number of stations, the information block being separately encoded from the first segment, the first signaling field comprising an information block including bandwidth information, the information block including the bandwidth information being separately encoded from information of the second signaling field, and the at least one station including the station; and the downlink frame decoder to decode the separately encoded information block for the station using information received in the first segment of the second WLAN signaling field.

64. The apparatus of claim 63, wherein the downlink frame decoder further decodes the separately encoded information block for the station using information received in the first signaling field.

65. The apparatus of claim 63, wherein the downlink frame decoder is further to receive information common to the number of stations in at least two sub-bands of a plurality of sub-bands of a shared radio frequency spectrum band.

66. The apparatus of claim 63, wherein the downlink frame decoder is further to receive the downlink frame including the separately encoded information block and an additional separately encoded information block in one sub-band of a plurality of sub-bands of a shared radio frequency spectrum band.

67. A non-transitory computer-readable medium storing computer-executable code for wireless communication at a station, the code executable by a processor to:

receive a downlink frame in a shared radio frequency spectrum band, the downlink frame comprising at least a first signaling field and a second signaling field, the first signaling field and the second signaling field being separately encoded, the second signaling field comprising a first segment having information common to a number of stations and a second segment having an information block for at least one station of the number of stations, the information block being separately encoded from the first segment, the first signaling field comprising an information block including bandwidth information, the information block including the bandwidth information being separately encoded from information of the second signaling field, and the at least one station including the station; and decode the separately encoded information block for the station using information received in the first segment of the second signaling field.

68. The non-transitory computer-readable medium of claim 67, wherein the code executable by the processor to receive a downlink frame comprises code executable by the processor to receive information common to the number of stations in at least two sub-bands of a plurality of sub-bands of a shared radio frequency spectrum band.

69. The non-transitory computer-readable medium of claim 67, wherein the code executable by the processor to receive a downlink frame comprises code executable by the processor to receive the downlink frame including the separately encoded information block and an additional separately encoded information block in one sub-band of a plurality of sub-bands of a shared radio frequency spectrum band.

70. The non-transitory computer-readable medium of claim 53, wherein the code is further executable by the processor to duplicate the information common to each of the identified number of stations, and to transmit the duplicated information in at least two sub-bands of a plurality of sub-bands of a shared radio frequency spectrum band.

* * * * *